US012652382B2

(12) United States Patent
Lim

(10) Patent No.: US 12,652,382 B2
(45) Date of Patent: Jun. 9, 2026

(54) VIDEO SIGNAL ENCODING/DECODING METHOD, AND RECORDING MEDIUM HAVING BITSTREAM STORED THEREON

(71) Applicant: KT CORPORATION, Gyeonggi-do (KR)

(72) Inventor: Sung Won Lim, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 167 days.

(21) Appl. No.: 18/570,443

(22) PCT Filed: Sep. 23, 2022

(86) PCT No.: PCT/KR2022/014288
§ 371 (c)(1),
(2) Date: Dec. 14, 2023

(87) PCT Pub. No.: WO2023/048512
PCT Pub. Date: Mar. 30, 2023

(65) Prior Publication Data
US 2024/0267509 A1 Aug. 8, 2024

(30) Foreign Application Priority Data
Sep. 24, 2021 (KR) ........................ 10-2021-0126625

(51) Int. Cl.
*H04N 7/12* (2006.01)
*H04N 19/105* (2014.01)
(Continued)

(52) U.S. Cl.
CPC ......... *H04N 19/105* (2014.11); *H04N 19/167* (2014.11); *H04N 19/176* (2014.11); *H04N 19/196* (2014.11)

(58) Field of Classification Search
CPC .................................................... H04N 19/105
See application file for complete search history.

(56) References Cited

U.S. PATENT DOCUMENTS 11,509,923 B1 11/2022 Zhang et al.
12,531,984 B1 * 1/2026 Chen .................... H04N 19/107
(Continued)

FOREIGN PATENT DOCUMENTS

KR 10-2018-0085714 A 7/2018
KR 10-1982037 B1 5/2019
(Continued)

OTHER PUBLICATIONS

Korean Intellectual Property Office, International Search Report of International Application No. PCT/KR2022/014288, Jan. 10, 2023.
(Continued)

*Primary Examiner* — Young Lee
(74) *Attorney, Agent, or Firm* — IP Legal Services, LLC

(57) ABSTRACT
A video decoding method includes generating a prediction information merge list for a current block, selecting one of prediction information merge candidates included in the prediction information merge list on the basis of index information, and obtaining a prediction block for the current block on the basis of prediction information on the selected prediction information merge candidate.

11 Claims, 23 Drawing Sheets

(51) Int. Cl.
    *H04N 19/167*     (2014.01)
    *H04N 19/176*     (2014.01)
    *H04N 19/196*     (2014.01)

(56)        References Cited

U.S. PATENT DOCUMENTS

| | | | |
|---|---|---|---|
| 12,531,986 B2 * | 1/2026 | Wang | .................. H04N 19/117 |
| 2015/0103897 A1 | 4/2015 | Kim et al. | |
| 2018/0359470 A1 | 12/2018 | Lee et al. | |
| 2019/0373252 A1 | 12/2019 | Moon et al. | |
| 2020/0059660 A1 | 2/2020 | Kim et al. | |
| 2020/0059661 A1 | 2/2020 | Kim et al. | |
| 2020/0059662 A1 | 2/2020 | Kim et al. | |
| 2020/0059663 A1 | 2/2020 | Kim et al. | |
| 2020/0059664 A1 | 2/2020 | Kim et al. | |
| 2021/0037238 A1 | 2/2021 | Park et al. | |
| 2021/0144366 A1 | 5/2021 | Zhang et al. | |
| 2021/0144388 A1 | 5/2021 | Zhang et al. | |
| 2021/0144392 A1 | 5/2021 | Zhang et al. | |
| 2021/0152814 A1 | 5/2021 | Moon et al. | |
| 2021/0211716 A1 | 7/2021 | Zhang et al. | |
| 2022/0014761 A1 | 1/2022 | Zhang et al. | |
| 2022/0060742 A1 | 2/2022 | Kim et al. | |
| 2022/0159238 A1 | 5/2022 | Moon et al. | |
| 2022/0368916 A1 | 11/2022 | Zhang et al. | |
| 2023/0066631 A1 | 3/2023 | Moon et al. | |
| 2023/0106340 A1 | 4/2023 | Zhang et al. | |
| 2023/0269367 A1 | 8/2023 | Moon et al. | |
| 2023/0370632 A1 | 11/2023 | Kim et al. | |
| 2023/0370633 A1 | 11/2023 | Kim et al. | |
| 2023/0370634 A1 | 11/2023 | Kim et al. | |
| 2026/0024231 A1 * | 1/2026 | Nikitin | .................. G06T 9/002 |

FOREIGN PATENT DOCUMENTS

| | | |
|---|---|---|
| KR | 10-2020-0064153 A | 6/2020 |
| KR | 10-2021-0019481 A | 2/2021 |
| KR | 10-2021-0089148 A | 7/2021 |

OTHER PUBLICATIONS

Korean Intellectual Property Office, Written Opinion of International Application No. PCT/KR2022/014288, Jan. 10, 2023.

\* cited by examiner

(a) For mode 4

(b) For mode 20

(c) For mode 5

(a)

(b)

REFERENCE PICTURE(T-1)                    CURRENT PICTURE(T)

LO REFERENCE PICTURE(T-1)        CURRENT PICTURE(T)

LO REFERENCE PICTURE(T-1)        CURRENT PICTURE(T)        L1 REFERENCE PICTURE(T-1)

LO REFERENCE PICTURE(T-1)

CURRENT PICTURE(T)

L1 REFERENCE PICTURE(T+1)

LO REFERENCE PICTURE(T-2)

LO REFERENCE PICTURE(T-1)

CURRENT PICTURE(T)

REFERENCE SAMPLE

PREDICTION SAMPLE

REFERENCE SAMPLE

PREDICTION SAMPLE

INTEGER POSITION REFERENCE SAMPLE

FRACTIONAL POSITION REFERENCE SAMPLE (a)                                                        (b)

(a)                                              (b)

(a)                              (b)

(a)                        (b)

VIDEO SIGNAL ENCODING/DECODING METHOD, AND RECORDING MEDIUM HAVING BITSTREAM STORED THEREON

CROSS REFERENCE TO RELATED APPLICATIONS

This application is a National Stage Patent Application of PCT International Patent Application No. PCT/KR2022/014288 (filed on Sep. 23, 2022) under 35 U.S.C. § 371, which claims priority to Korean Patent Application No. 10-2021-0126625 (filed on Sep. 24, 2021), the teachings of which are incorporated herein in their entireties by reference.

BACKGROUND OF THE INVENTION

Field of the Invention

The present disclosure relates to a video signal processing method and apparatus.

Description of the Related Art

Recently, demand for high-resolution, high-quality images such as high definition (HD) images and ultra-high definition (UHD) images has been increasing in various application fields. As the resolution and quality of video data increase, the amount of data increases relative to existing video data, and thus when video data is transmitted using media such as conventional wired or wireless broadband lines or stored using conventional storage media, transmission costs and storage costs increase. High-efficiency video compression techniques can be used to solve such problems occurring as the resolution and quality of video data increase.

There are various video compression techniques such as an inter-prediction technique for predicting pixel values included in the current picture from pictures before or after the current picture, an intra-prediction technique for predicting pixel values included in the current picture using pixel information in the current picture, and an entropy coding technique for allocating short codes to values with a high frequency of appearance and allocating long codes to values with a low frequency of appearance. By using these video compression techniques, video data can be effectively compressed and transmitted or stored.

Meanwhile, as the demand for high-resolution video increases, the demand for three-dimensional video content as a new video service is also increasing. Discussions are underway regarding video compression technology for effectively providing high-resolution and ultra-high-resolution three-dimensional video content.

DISCLOSURE

Technical Problem

The present disclosure has been made in view of the above problems, and it is an object of the present disclosure to provide a method of performing motion estimation on the basis of a previously reconstructed picture on a decoder side and an apparatus for performing the same.

It is another object of the present disclosure to provide a method of partitioning a current block into a plurality of partitions and then obtaining prediction information for each partition, and an apparatus for performing the same.

It is a further object of the present disclosure to provide a merge mode that can be commonly used for intra-prediction and inter-prediction.

The objects to be achieved by the present disclosure are not limited to the objects mentioned above, and other objects which are not mentioned can be clearly understood by those skilled in the art from the description below.

Technical Solution

In accordance with an aspect of the present disclosure, the above and other objects can be accomplished by the provision of a video decoding method including generating a prediction information merge list for a current block, selecting one of prediction information merge candidates included in the prediction information merge list on the basis of index information, and obtaining a prediction block for the current block on the basis of prediction information on the selected prediction information merge candidate. Here, the prediction information may include coding mode information, the prediction information may further include intra-prediction mode information in a case where the coding mode information indicates intra-prediction, and the prediction information may further include motion information in a case where the coding mode information indicates inter-prediction.

In accordance with another aspect of the present disclosure, there is provided a video encoding method including generating a prediction information merge list for a current block, selecting a prediction information merge candidate the same as prediction information on the current block from among prediction information merge candidates included in the prediction information merge list, and encoding index information indicating the selected prediction information merge candidate. Here, the prediction information may include coding mode information, the prediction information may further include intra-prediction mode information in a case where the coding mode information indicates intra-prediction, and the prediction information may further include motion information in a case where the coding mode information indicates inter-prediction.

In the video decoding/encoding method according to the present disclosure, the prediction information merge candidates may be derived on the basis of prediction information on neighboring blocks adjacent to the current block.

In the video decoding/encoding method according to the present disclosure, an index assigned to each of the prediction information merge candidates in the prediction information merge list may be determined on the basis of a cost of a neighboring block used to derive the prediction information merge candidate.

In the video decoding/encoding method according to the present disclosure, the cost may be calculated on the basis of the sum of absolute values of differences between reconstructed samples within the neighboring block and prediction samples.

In the video decoding/encoding method according to the present disclosure, the cost may be calculated on the basis of the sum of absolute values of differences between reconstructed samples included in a predefined area within the neighboring block and prediction samples.

In the video decoding/encoding method according to the present disclosure, a flag indicating whether a prediction information merge mode is applied to the current block may be explicitly signaled through a bitstream.

In the video decoding/encoding method according to the present disclosure, in a case where the current block is partitioned into a plurality of partitions, the index information may be signaled for each of the partitions.

In the video decoding/encoding method according to the present disclosure, the current block may be partitioned by two partitioning lines, and information for identifying a direction and a position of each of the two partitioning lines may be explicitly signaled.

In the video decoding/encoding method according to the present disclosure, neighboring partitions among the plurality of partitions may have different pieces of prediction information.

The features briefly summarized above with respect to the present disclosure are merely exemplary aspects of the detailed description of the present disclosure described below and do not limit the scope of the present disclosure.
Technical Effect According to the present disclosure, signaling overhead can be reduced by performing motion estimation based on a previously reconstructed picture on the decoder side.

According to the present disclosure, prediction accuracy can be improved by performing prediction for each partition.

According to the present disclosure, a merge mode that can be commonly used for intra-prediction and inter-prediction is provided, thereby reducing the number of bits required to encode/decode prediction information.

The effects that can be obtained from the present disclosure are not limited to the effects mentioned above, and other effects that are not mentioned can be clearly understood by those skilled in the art from the description below.

BRIEF DESCRIPTION OF THE DRAWINGS

FIGS. 3 to 11 illustrate a block partitioning method according to the present disclosure.

Figure 1:
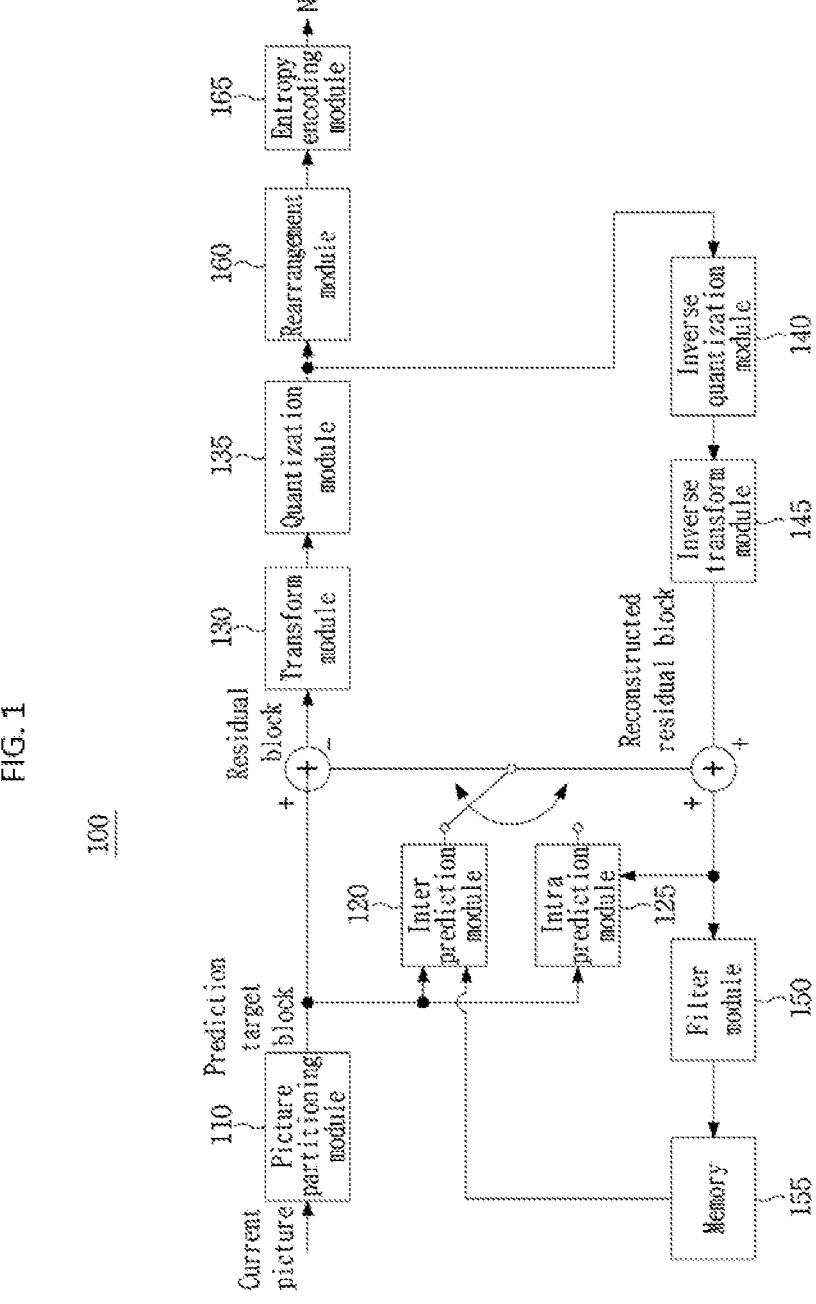
FIG. 1 is a block diagram showing an image encoding device according to an embodiment of the present disclosure.

DETAILED DESCRIPTION OF THE
INVENTION

As the present disclosure may make various changes and have several embodiments, specific embodiments will be illustrated in a drawing and described in detail. But, it is not intended to limit the present disclosure to a specific embodiment, and it should be understood that it includes all changes, equivalents or substitutes included in an idea and a technical scope for the present disclosure. A similar reference numeral was used for a similar component while describing each drawing.

A term such as first, second, etc. may be used to describe various components, but the components should not be limited by the terms. The terms are used only to distinguish one component from other components. For example, without going beyond a scope of a right of the present disclosure, a first component may be referred to as a second component and similarly, a second component may be also referred to as a first component. A term of and/or includes a combination of a plurality of relative entered items or any item of a plurality of relative entered items.

When a component is referred to as being "linked" or "connected" to other component, it should be understood that it may be directly linked or connected to that other component, but other component may exist in the middle. On the other hand, when a component is referred to as being "directly linked" or "directly connected" to other component, it should be understood that other component does not exist in the middle.

As terms used in this application are just used to describe a specific embodiment, they are not intended to limit the present disclosure. Expression of the singular includes expression of the plural unless it clearly has a different meaning contextually. In this application, it should be understood that a term such as "include" or "have", etc. is to designate the existence of characteristics, numbers, steps, motions, components, parts or their combinations entered in the specification, but is not to exclude a possibility of addition or existence of one or more other characteristics, numbers, steps, motions, components, parts or their combinations in advance.

Hereinafter, referring to the attached drawings, a desirable embodiment of the present disclosure will be described in more detail. Hereinafter, the same reference numeral is used for the same component in a drawing and an overlapping description for the same component is omitted.

FIG. 1 is a block diagram showing an image encoding device according to an embodiment of the present disclosure.

Referring to FIG. 1, an image encoding device 100 may include a picture partitioning unit 110, prediction units 120 and 125, a transform unit 130, a quantization unit 135, a rearrangement unit 160, an entropy encoding unit 165, a dequantization unit 140, an inverse-transform unit 145, a filter unit 150, and a memory 155.

As each construction unit shown in FIG. 1 is independently shown to represent different characteristic functions in an image encoding device, it does not mean that each construction unit is constituted by separated hardware or one software unit. That is, as each construction unit is included by being enumerated as each construction unit for convenience of a description, at least two construction units of each construction unit may be combined to constitute one construction unit or one construction unit may be partitioned into a plurality of construction units to perform a function, and even an integrated embodiment and a separated embodiment of each construction unit are also included in a scope of a right of the present disclosure unless they are departing from the essence of the present disclosure.

Further, some components may be just an optional component for improving performance, not a necessary component which perform an essential function in the present disclosure. The present disclosure may be implemented by including only a construction unit necessary for implementing the essence of the present disclosure excluding a component used to just improve performance, and a structure including only a necessary component excluding an optional component used to just improve performance is also included in a scope of a right of the present disclosure.

A picture partitioning unit 110 may partition an input picture into at least one processing unit. In this case, a processing unit may be a prediction unit (PU), a transform unit (TU) or a coding unit (CU). In a picture partitioning unit 110, one picture may be partitioned into a combination of a plurality of coding units, prediction units and transform units and a picture may be encoded by selecting a combination of one coding unit, prediction unit and transform unit according to a predetermined standard (e.g., a cost function).

For example, one picture may be partitioned into a plurality of coding units. In order to partition a coding unit in a picture, a recursive tree structure such as a quad tree, a ternary tree or a binary tree may be used, and a coding unit which is partitioned into other coding units by using one image or the largest coding unit as a route may be partitioned with as many child nodes as the number of partitioned coding units. A coding unit which is no longer partitioned according to a certain restriction becomes a leaf node. In an example, when it is assumed that quad tree partitioning is applied to one coding unit, one coding unit may be partitioned into up to four other coding units.

Hereinafter, in an embodiment of the present disclosure, a coding unit may be used as a unit for encoding or may be used as a unit for decoding.

A prediction unit may be partitioned with at least one square or rectangular shape, etc. in the same size in one coding unit or may be partitioned so that any one prediction unit of prediction units partitioned in one coding unit can have a shape and/or a size different from another prediction unit.

In intra prediction, a transform unit may be configured to be the same as a prediction unit. In this case, after partitioning a coding unit into a plurality of transform units, intra prediction may be performed per each transform unit. A coding unit may be partitioned in a horizontal direction or in a vertical direction. The number of transform units generated by partitioning a coding unit may be 2 or 4 according to a size of a coding unit.

Prediction units 120 and 125 may include an inter prediction unit 120 performing inter prediction and an intra prediction unit 125 performing intra prediction. Whether to perform inter prediction or intra prediction for a coding unit may be determined and detailed information according to each prediction method (e.g., an intra prediction mode, a motion vector, a reference picture, etc.) may be determined. In this case, a processing unit that prediction is performed may be different from a processing unit that a prediction method and details are determined. For example, a prediction method, a prediction mode, etc. may be determined in a coding unit and prediction may be performed in a prediction unit or a transform unit. A residual value (a residual block) between a generated prediction block and an original block may be input to a transform unit 130. In addition, prediction mode information, motion vector information, etc. used for prediction may be encoded with a residual value in an entropy encoding unit 165 and may be transmitted to a decoding device. When a specific encoding mode is used, an original block may be encoded as it is and transmitted to a decoding unit without generating a prediction block through prediction units 120 or 125.

An inter prediction unit 120 may predict a prediction unit based on information on at least one picture of a previous picture or a subsequent picture of a current picture, or in some cases, may predict a prediction unit based on information on some encoded regions in a current picture. An inter prediction unit 120 may include a reference picture interpolation unit, a motion prediction unit and a motion compensation unit.

A reference picture interpolation unit may receive reference picture information from a memory 155 and generate pixel information equal to or less than an integer pixel in a reference picture. For a luma pixel, a 8-tap DCT-based interpolation filter having a different filter coefficient may be used to generate pixel information equal to or less than an integer pixel in a ¼ pixel unit. For a chroma signal, a 4-tap DCT-based interpolation filter having a different filter coefficient may be used to generate pixel information equal to or less than an integer pixel in a ⅛ pixel unit.

A motion prediction unit may perform motion prediction based on a reference picture interpolated by a reference picture interpolation unit. As a method for calculating a motion vector, various methods such as FBMA (Full search-based Block Matching Algorithm), TSS (Three Step Search), NTS (New Three-Step Search Algorithm), etc. may be used. A motion vector may have a motion vector value in a ½ or ¼ pixel unit based on an interpolated pixel. A motion prediction unit may predict a current prediction unit by varying a motion prediction method. As a motion prediction method, various methods such as a skip method, a merge method, an advanced motion vector prediction (AMVP) method, an intra block copy method, etc. may be used.

An intra prediction unit 125 may generate a prediction unit based on reference pixel information which is pixel information in a current picture. Reference pixel information may be derived from selected one of a plurality of reference pixel lines. A N-th reference pixel line among a plurality of reference pixel lines may include left pixels whose x-axis difference with a top-left pixel in a current block is N and top pixels whose y-axis difference with the top-left pixel is N. The number of reference pixel lines which may be selected by a current block may be 1, 2, 3 or 4.

When a neighboring block in a current prediction unit is a block which performed inter prediction and accordingly, a reference pixel is a pixel which performed inter prediction, a reference pixel included in a block which performed inter prediction may be used by being replaced with reference pixel information of a surrounding block which performed intra prediction. In other words, when a reference pixel is unavailable, unavailable reference pixel information may be used by being replaced with at least information of available reference pixels.

A prediction mode in intra prediction may have a directional prediction mode using reference pixel information according to a prediction direction and a non-directional mode not using directional information when performing prediction. A mode for predicting luma information may be different from a mode for predicting chroma information and intra prediction mode information used for predicting luma information or predicted luma signal information may be utilized to predict chroma information.

When a size of a prediction unit is the same as that of a transform unit in performing intra prediction, intra prediction for a prediction unit may be performed based on a pixel at a left position of a prediction unit, a pixel at a top-left position and a pixel at a top position.

An intra prediction method may generate a prediction block after applying a smoothing filter to a reference pixel according to a prediction mode. According to a selected reference pixel line, whether a smoothing filter is applied may be determined.

In order to perform an intra prediction method, an intra prediction mode in a current prediction unit may be predicted from an intra prediction mode in a prediction unit around a current prediction unit. When a prediction mode in a current prediction unit is predicted by using mode information predicted from a surrounding prediction unit, information that a prediction mode in a current prediction unit is the same as a prediction mode in a surrounding prediction unit may be transmitted by using predetermined flag information if an intra prediction mode in a current prediction unit is the same as an intra prediction mode in a surrounding prediction unit, and prediction mode information of a current block may be encoded by performing entropy encoding if a prediction mode in a current prediction unit is different from a prediction mode in a surrounding prediction unit.

In addition, a residual block may be generated which includes information on a residual value that is a difference value between a prediction unit which performed prediction based on a prediction unit generated in prediction units 120 and 125 and an original block in a prediction unit. A generated residual block may be input to a transform unit 130.

A transform unit 130 may transform an original block and a residual block including residual value information in a prediction unit generated through prediction units 120 and 125 by using a transform method such as DCT (Discrete Cosine Transform), DST (Discrete Sine Transform), KLT. Whether to apply DCT, DST or KLT to transform a residual block may be determined based on at least one of a size of a transform unit, a form of a transform unit, a prediction mode in a prediction unit or intra prediction mode information in a prediction unit.

A quantization unit 135 may quantize values transformed into a frequency domain in a transform unit 130. A quantization coefficient may be changed according to a block or importance of an image. A value calculated in a quantization unit 135 may be provided to a dequantization unit 140 and a rearrangement unit 160.

A rearrangement unit 160 may perform rearrangement of a coefficient value for a quantized residual value.

A rearrangement unit 160 may change a coefficient in a shape of a two-dimensional block into a shape of a one-dimensional vector through a coefficient scan method. For example, a rearrangement unit 160 may scan a DC coefficient to a coefficient in a high-frequency domain by using a zig-zag scan method and change it into a shape of a one-dimensional vector. According to a size of a transform unit and an intra prediction mode, instead of zig-zag scan, vertical scan where a coefficient in a shape of a two-dimensional block is scanned in a column direction, horizontal scan where a coefficient in a shape of a two-dimensional block is scanned in a row direction or diagonal scan where a coefficient in a shape of a two-dimensional block is scanned in a diagonal direction may be used. In other words, which scan method among zig-zag scan, vertical directional scan, horizontal directional scan or diagonal scan will be used may be determined according to a size of a transform unit and an intra prediction mode.

An entropy encoding unit 165 may perform entropy encoding based on values calculated by a rearrangement unit 160. Entropy encoding, for example, may use various encoding methods such as exponential Golomb, CAVLC (Context-Adaptive Variable Length Coding), CABAC (Context-Adaptive Binary Arithmetic Coding).

An entropy encoding unit 165 may encode a variety of information such as residual value coefficient information and block type information in a coding unit, prediction mode information, partitioning unit information, prediction unit information and transmission unit information, motion vector information, reference frame information, block interpolation information, filtering information, etc. from a rearrangement unit 160 and prediction units 120 and 125.

An entropy encoding unit 165 may perform entropy encoding for a coefficient value in a coding unit which is input from a rearrangement unit 160.

A dequantization unit 140 and an inverse transform unit 145 dequantize values quantized in a quantization unit 135 and inversely transform values transformed in a transform unit 130. A residual value generated by a dequantization unit 140 and an inverse transform unit 145 may be combined with a prediction unit predicted by a motion prediction unit, a motion compensation unit and an intra prediction unit included in prediction units 120 and 125 to generate a reconstructed block.

A filter unit 150 may include at least one of a deblocking filter, an offset correction unit and an adaptive loop filter (ALF).

A deblocking filter may remove block distortion which is generated by a boundary between blocks in a reconstructed picture. In order to determine whether deblocking is performed, whether a deblocking filter will be applied to a current block may be determined based on a pixel included in several rows or columns included in a block. When a deblocking filter is applied to a block, a strong filter or a weak filter may be applied according to required deblocking filtering strength. In addition, in applying a deblocking filter, when horizontal filtering and vertical filtering are performed, horizontal directional filtering and vertical directional filtering may be set to be processed in parallel.

An offset correction unit may correct an offset with an original image in a unit of a pixel for an image that deblocking was performed. In order to perform offset correction for a specific picture, a region where an offset will be performed may be determined after dividing a pixel included in an image into the certain number of regions and a method in which an offset is applied to a corresponding region or a method in which an offset is applied by considering edge information of each pixel may be used.

Adaptive loop filtering (ALF) may be performed based on a value obtained by comparing a filtered reconstructed image with an original image. After a pixel included in an image is divided into predetermined groups, filtering may be discriminately performed per group by determining one filter which will be applied to a corresponding group. Information related to whether to apply ALF may be transmitted per coding unit (CU) for a luma signal and a shape and a filter coefficient of an ALF filter to be applied may vary according to each block. In addition, an ALF filter in the same shape (fixed shape) may be applied regardless of a characteristic of a block to be applied.

A memory 155 may store a reconstructed block or picture calculated through a filter unit 150 and a stored reconstructed block or picture may be provided to prediction units 120 and 125 when performing inter prediction.

Figure 2:
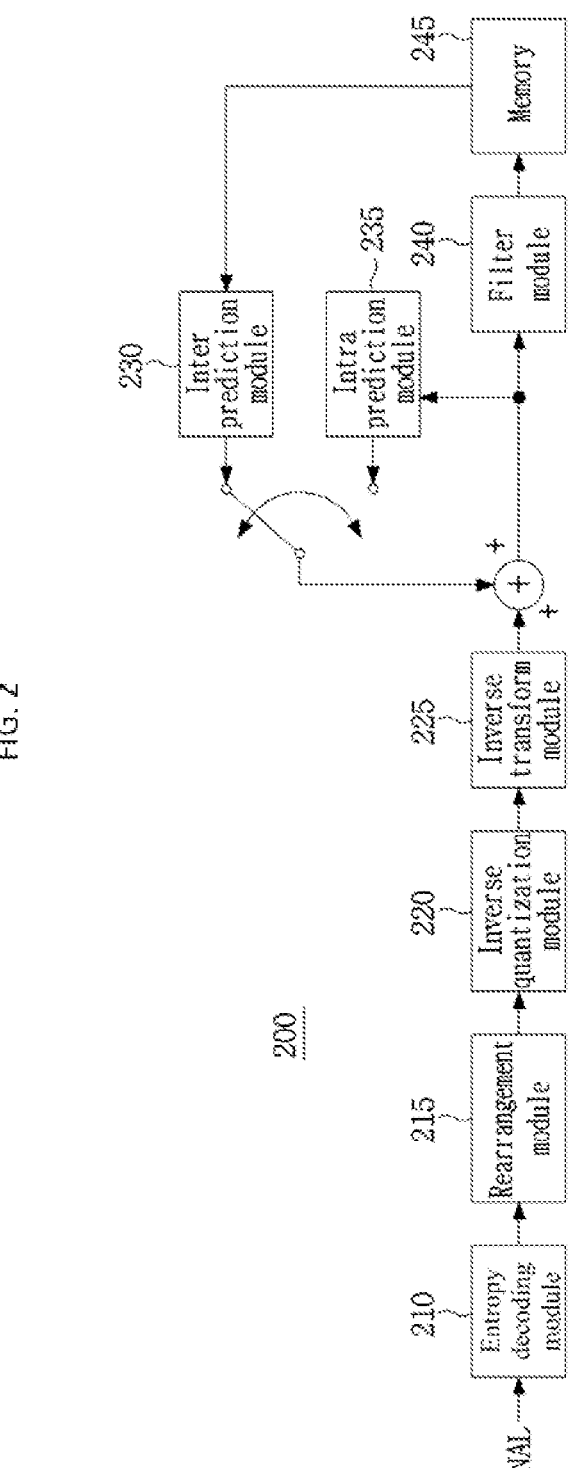
FIG. 2 is a block diagram showing an image decoding device according to an embodiment of the present disclosure.

FIG. 2 is a block diagram showing an image decoding device according to an embodiment of the present disclosure.

Referring to FIG. 2, an image decoding device 200 may include an entropy decoding unit 210, a rearrangement unit 215, a dequantization unit 220, an inverse transform unit 225, prediction units 230 and 235, a filter unit 240, and a memory 245.

When an image bitstream is input from an image encoding device, an input bitstream may be decoded according to a procedure opposite to that of an image encoding device.

An entropy decoding unit 210 may perform entropy decoding according to a procedure opposite to a procedure in which entropy encoding is performed in an entropy encoding unit of an image encoding device. For example, in response to a method performed in an image encoding device, various methods such as Exponential Golomb, CAVLC (Context-Adaptive Variable Length Coding), CABAC (Context-Adaptive Binary Arithmetic Coding) may be applied.

An entropy decoding unit 210 may decode information related to intra prediction and inter prediction performed in an encoding device.

A rearrangement unit 215 may perform rearrangement based on a method that a bitstream entropy-decoded in an entropy decoding unit 210 is rearranged in an encoding unit. Coefficients expressed in a form of a one-dimensional vector may be rearranged by being reconstructed into coefficients in a form of a two-dimensional block. A rearrangement unit 215 may receive information related to coefficient scanning performed in an encoding unit and perform rearrangement through a method in which scanning is inversely performed based on scanning order performed in a corresponding encoding unit.

A dequantization unit 220 may perform dequantization based on a quantization parameter provided from an encoding device and a coefficient value of a rearranged block.

An inverse transform unit 225 may perform transform performed in a transform unit, i.e., inverse transform for DCT, DST, and KLT, i.e., inverse DCT, inverse DST and inverse KLT for a result of quantization performed in an image encoding device. Inverse transform may be performed based on a transmission unit determined in an image encoding device. In an inverse transform unit 225 of an image decoding device, a transform technique (for example, DCT, DST, KLT) may be selectively performed according to a plurality of information such as a prediction method, a size or a shape of a current block, a prediction mode, an intra prediction direction, etc.

Prediction units 230 and 235 may generate a prediction block based on information related to generation of a prediction block provided from an entropy decoding unit 210 and pre-decoded block or picture information provided from a memory 245.

As described above, when a size of a prediction unit is the same as a size of a transform unit in performing intra prediction in the same manner as an operation in an image encoding device, intra prediction for a prediction unit may be performed based on a pixel at a left position of a prediction unit, a pixel at a top-left position and a pixel at a top position, but when a size of a prediction unit is different from a size of a transform unit in performing intra prediction, intra prediction may be performed by using a reference pixel based on a transform unit. In addition, intra prediction using N×N partitioning may be used only for the smallest coding unit.

Prediction units 230 and 235 may include a prediction unit determination unit, an inter prediction unit and an intra prediction unit. A prediction unit determination unit may receive a variety of information such as prediction unit information, prediction mode information of an intra prediction method, motion prediction-related information of an inter prediction method, etc. which are input from an entropy decoding unit 210, divide a prediction unit in a current coding unit and determine whether a prediction unit performs inter prediction or intra prediction. An inter prediction unit 230 may perform inter prediction for a current prediction unit based on information included in at least one picture of a previous picture or a subsequent picture of a current picture including a current prediction unit by using information necessary for inter prediction in a current prediction unit provided from an image encoding device. Alternatively, inter prediction may be performed based on information on some regions which are pre-reconstructed in a current picture including a current prediction unit.

In order to perform inter prediction, whether a motion prediction method in a prediction unit included in a corresponding coding unit is a skip mode, a merge mode, an AMVP mode, or an intra block copy mode may be determined based on a coding unit.

An intra prediction unit 235 may generate a prediction block based on pixel information in a current picture. When a prediction unit is a prediction unit which performed intra prediction, intra prediction may be performed based on intra prediction mode information in a prediction unit provided from an image encoding device. An intra prediction unit 235 may include an adaptive intra smoothing (AIS) filter, a reference pixel interpolation unit and a DC filter. As a part performing filtering on a reference pixel of a current block, an AIS filter may be applied by determining whether a filter is applied according to a prediction mode in a current prediction unit. AIS filtering may be performed for a reference pixel of a current block by using AIS filter information and a prediction mode in a prediction unit provided from an image encoding device. When a prediction mode of a current block is a mode which does not perform AIS filtering, an AIS filter may not be applied When a prediction mode in a prediction unit is a prediction unit which performs intra prediction based on a pixel value which interpolated a reference pixel, a reference pixel interpolation unit may interpolate a reference pixel to generate a reference pixel in a unit of a pixel equal to or less than an integer value. When a prediction mode in a current prediction unit is a prediction mode which generates a prediction block without interpolating a reference pixel, a reference pixel may not be interpolated. A DC filter may generate a prediction block through filtering when a prediction mode of a current block is a DC mode.

A reconstructed block or picture may be provided to a filter unit 240. A filter unit 240 may include a deblocking filter, an offset correction unit and ALF.

Information on whether a deblocking filter was applied to a corresponding block or picture and information on whether a strong filter or a weak filter was applied when a deblocking filter was applied may be provided from an image encoding device. Information related to a deblocking filter provided from an image encoding device may be provided in a deblocking filter of an image decoding device and deblocking filtering for a corresponding block may be performed in an image decoding device.

An offset correction unit may perform offset correction on a reconstructed image based on offset value information, a type of offset correction, etc. applied to an image when performing encoding.

ALF may be applied to a coding unit based on information on whether ALF is applied, ALF coefficient information, etc. provided from an encoding device. Such ALF information may be provided by being included in a specific parameter set.

A memory 245 may store a reconstructed picture or block for use as a reference picture or a reference block and provide a reconstructed picture to an output unit.

As described above, hereinafter, the term "coding unit" is used as a coding unit for convenience of description in embodiments of the present disclosure, but it may also be a unit in which decoding is performed.

In addition, the current block represents an encoding/decoding target block, and depending on the encoding/decoding stage, the current block may represent a coding tree block (or a coding tree unit), a coding block (or a coding unit), a transform block (or a transform unit), a prediction block (or a prediction unit), or a block to which an in-loop filter is applied. In this specification, "unit" may represent a basic unit for performing a specific encoding/decoding process, and "block" may represent a pixel array of a predetermined size. Unless otherwise specified, "block" and "unit" can be used with the same meaning. For example, in embodiments which will be described later, a coding block and a coding unit may be understood to have equivalent meanings.

Furthermore, a picture including the current block will be referred to as a current picture.

FIGS. 3 to 11 illustrate a block partitioning method according to the present disclosure.

In an embodiment which will be described later, a "block" is an encoding/decoding target and may represent any one of a coding block, a prediction block, or a transform block.

Furthermore, rectangular or non-rectangular partitions can be generated by partitioning a block. These partitions can be set as basic units for performing a specific encoding/decoding process. As an example, each partition may be set as a coding unit, a prediction unit, or a transform unit.

One block can be partitioned into a plurality of blocks having various sizes and shapes through a tree structure. A partitioned block can also be re-partitioned into a plurality of blocks having various sizes and shapes. In this manner, recursively partitioning a block can be defined as "tree structure"-based partitioning.

Tree structure-based partitioning may be performed based on predetermined partitioning information. Here, the partitioning information may be encoded by an encoding device and transmitted through a bitstream, or may be derived by an encoding/decoding device. The partitioning information may include information (hereinafter referred to as a partitioning flag) indicating whether to partition a block. When the partitioning flag indicates partitioning of a block, the block is partitioned and a process proceeds to the next block in encoding order. Here, the next block is a block on which encoding will be performed first among the partitioned blocks. If the partitioning flag indicates that a block is not partitioned, coding information on the block is encoded, and then the block partitioning process proceeds to the next block or ends depending on presence or absence of the next block.

Partitioning information may include information on tree partitioning. Hereinafter, a tree partitioning method used for block partitioning will be described.

Figure 3:
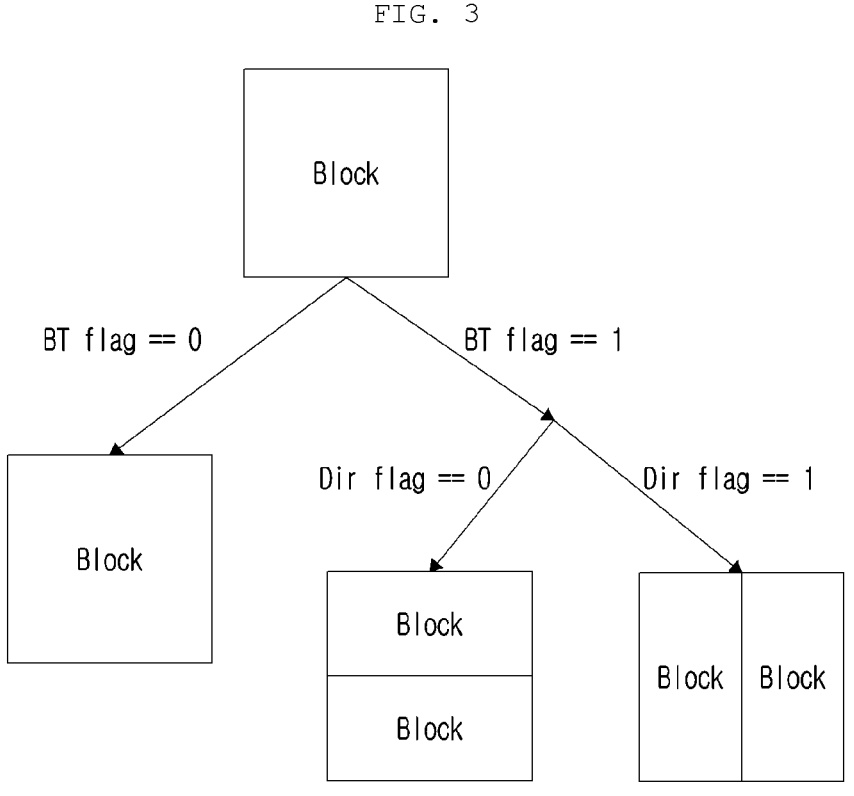

A binary tree (BT) partitioning method is a method of partitioning a block into two partitions. Blocks generated by two partitions may have the same size. FIG. 3 shows an example of BT partitioning a block through a BT flag.

Whether to partition a block can be determined through the BT flag. For example, if the BT flag is 0, BT partitioning is terminated. On the other hand, if the BT flag is 1, the block can be partitioned into two blocks using a Dir flag that indicates a partitioning direction.

Figure 4:
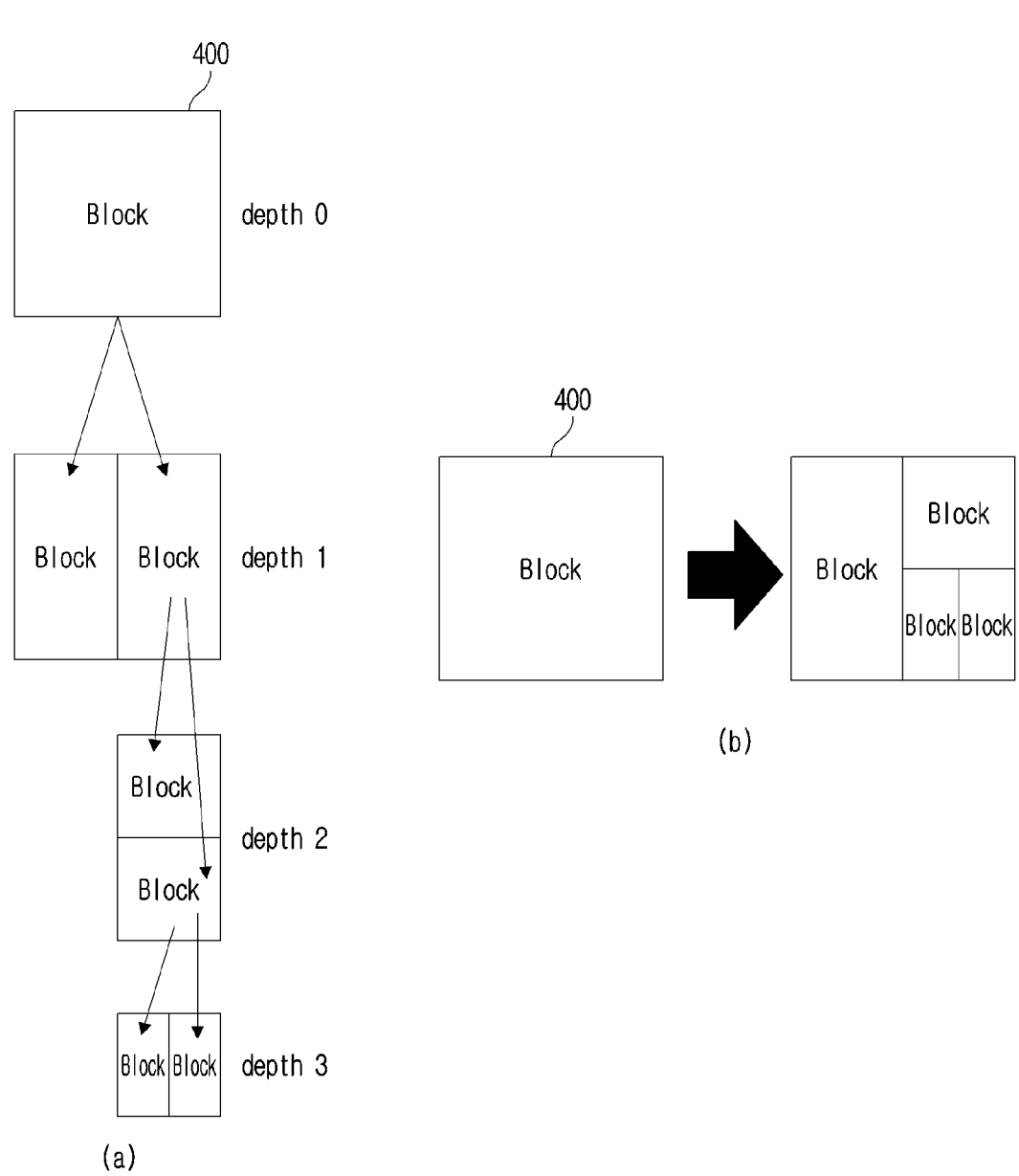

Additionally, a partitioned block can be represented by depth information. FIG. 4 shows an example of depth information.

FIG. 4(*a*) is an example showing a process of partitioning a block 400 through BT partitioning and the value of depth information. Each time the block is partitioned, the value of depth information may increase by 1. In a case where a block with depth N is partitioned into blocks with depth (N+1), the block with depth N is called a parent block of the blocks with depth (N+1). On the other hand, a block with depth (N+1) is called a child block of the block with depth N. This can be equally applied to the tree structure which will be described later. FIG. 4(*b*) shows the final partitioned shape of the block 400 when the block 400 is partitioned as in (a) using BT.

Figures 5, 6:
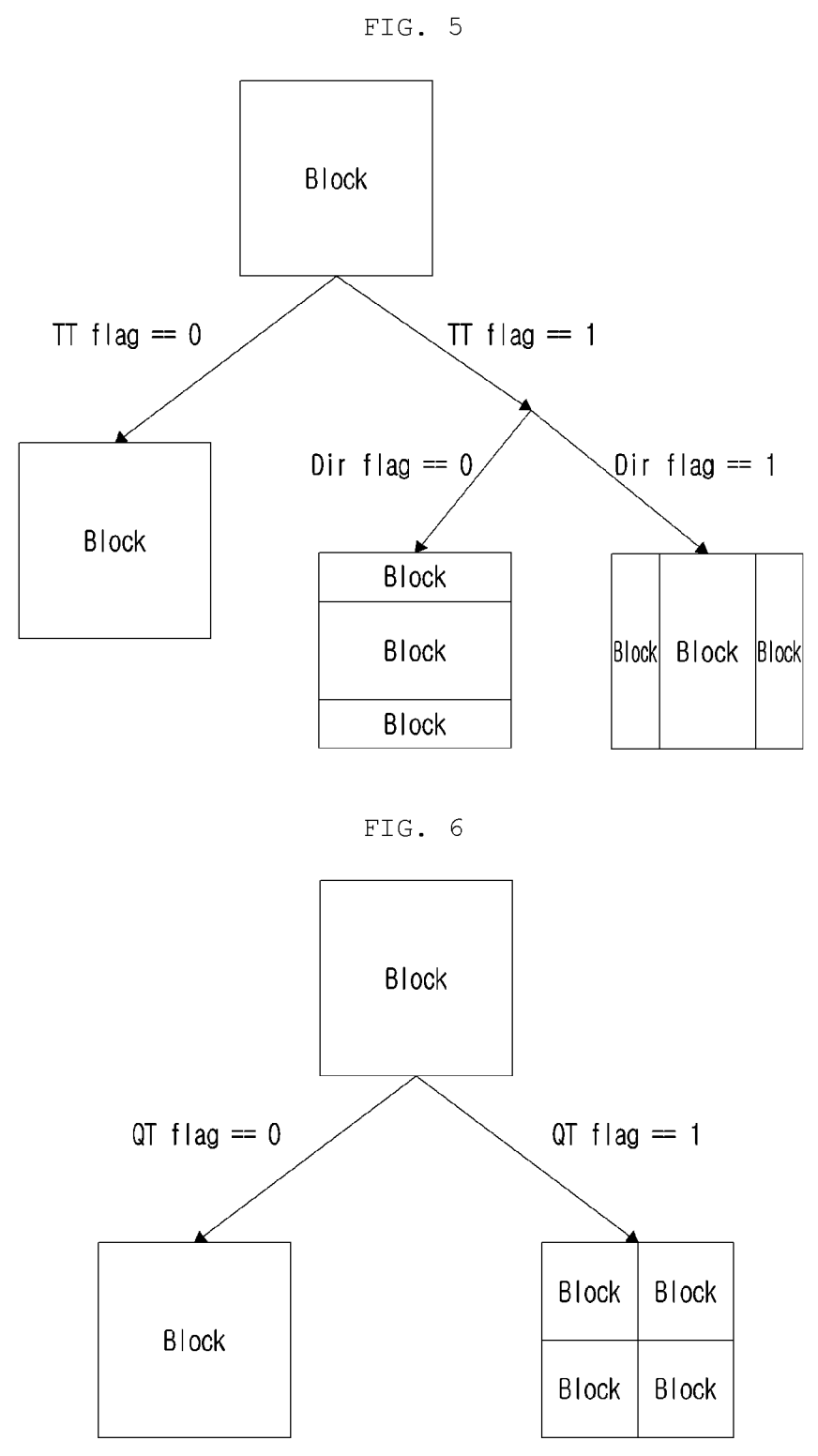

A ternary-tree (TT) partitioning method is a method of partitioning a block into three child blocks. At this time, child blocks may have a ratio of 1:2:1. FIG. 5 shows an example of TT partitioning a block through a TT flag.

Whether to partition a block can be determined through the TT flag. For example, if the TT flag is 0, TT partitioning is terminated. On the other hand, if the TT flag is 1, a block can be partitioned into three child blocks in the horizontal or vertical direction using the Dir flag.

A quad-tree (QT) partitioning method is a method of partitioning a block into four child blocks. Four child blocks may have the same size. FIG. 6 shows an example of QT partitioning a block through a QT flag.

Whether to partition a block through the QT flag. For example, if the QT flag is 0, QT partitioning is terminated. On the other hand, if the QT flag is 1, a block can be partitioned into four child blocks.

One block may be partitioned in various manners other than BT partitioning, TT partitioning, and QT partitioning shown in FIGS. 4 to 6.

The boundary between objects or between a background and an object may have various directions in addition to the horizontal or vertical direction. In consideration of this, a block may be partitioned in a diagonal direction in addition to horizontal partitioning, vertical partitioning, or a combination of horizontal partitioning and vertical partitioning as shown in FIGS. 4 to 6.

FIGS. 7 to 11 are diagrams illustrating an example in which a block is partitioned in a diagonal direction.

Figure 7:
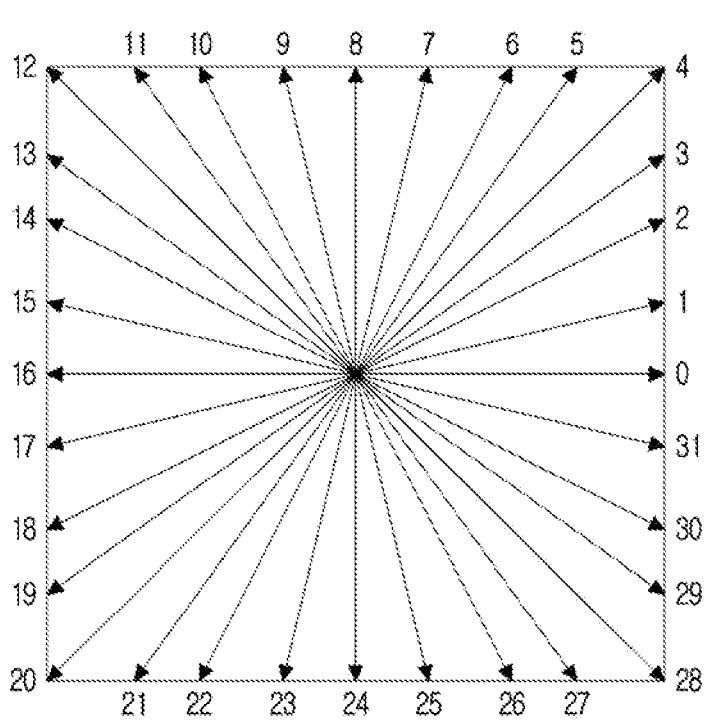
Figure 8:
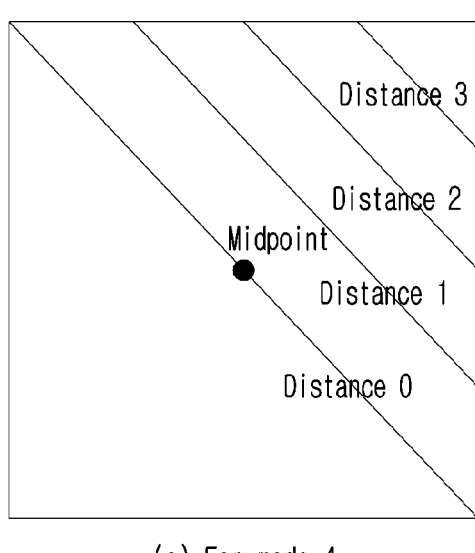
Figure 8:
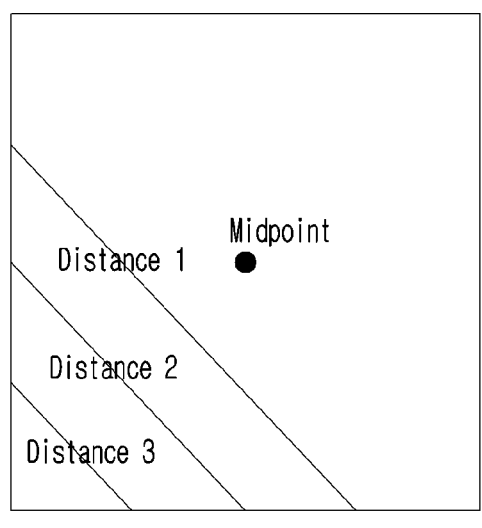
Figure 8:
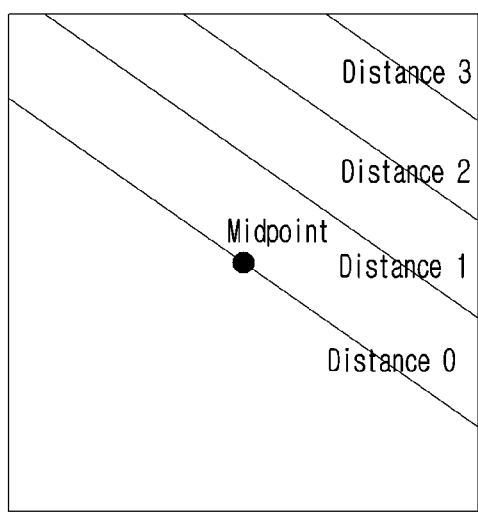

FIG. 7 is an example showing directions in which a partitioning line partitioning a block is placed, and FIG. 8 is an example showing locations of partitioning lines.

In FIG. 7, 32 partitioning directions are illustrated, and different mode numbers (0 to 31) are assigned to the partitioning directions. In addition, in FIG. 8, a partitioning line passing through the center point of a block is called a partitioning line with distance 0, and it is assumed that partitioning lines with distance 1 to distance 3 are present depending on distances from the center line.

A block can be partitioned by a partitioning line perpendicular to a partitioning direction shown in FIG. 7. At this time, in order to prevent overlap between modes with opposite partitioning directions, the partitioning line with distance 0 may be set to be used as a candidate for only one of modes with opposite partitioning directions.

For example, as in the example shown in FIG. 8, one of distances 0 to 3 can be selected when mode #4 is selected, whereas one of distances 1 to 3 can be selected when mode #20 is selected.

As in the examples shown in FIGS. 7 and 8, a block partition type may be determined based on the partitioning direction and the distance of the partitioning line. To this end, information indicating the partitioning direction of a block and information indicating the distance of the partitioning line may be encoded and signaled.

Figure 9:
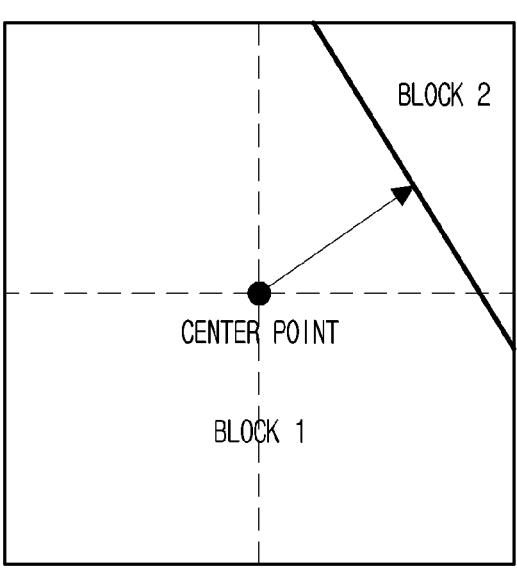

FIG. 9 shows an example of partitioning a block according to the description of FIGS. 7 and 8.

In a case where mode #3 in FIG. 7 is selected and distance 2 is selected, the block can be partitioned into two partitions, as in the example shown in FIG. 9.

A block may be partitioned into three or more partitions using a plurality of partitioning lines.

Figure 10:
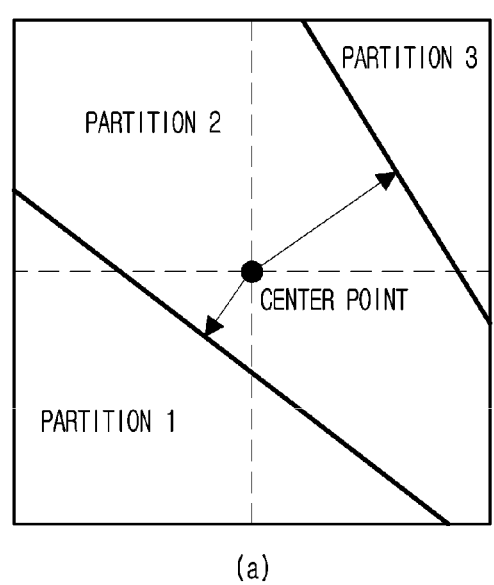
Figure 10:
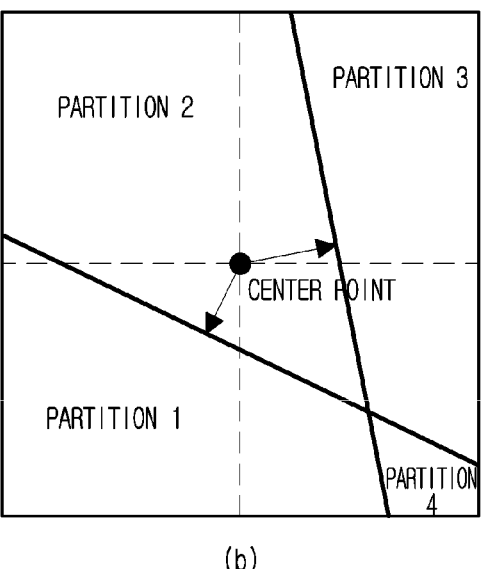

FIG. 10 shows an example of partitioning a block into a plurality of partitions using a plurality of diagonal lines.

FIGS. 10(*a*) and (*b*) show examples in which a block is partitioned by two diagonal lines. In FIG. 10(*a*), a first partition and a second partition are defined by a partitioning line corresponding to mode #21 in FIG. 7 and distance 1 in FIG. 8, and the second partition and a third partition are defined by a partitioning line corresponding to mode #3 in FIG. 21 and distance 2 in FIG. 8.

Figure 21:
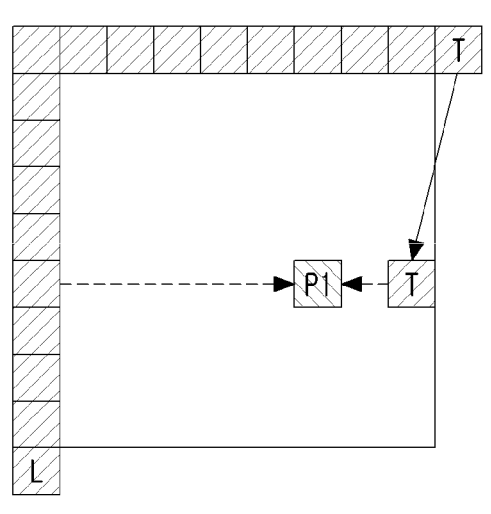
FIG. 21 shows an example in which a prediction sample is generated in a planar mode.
Figure 21:
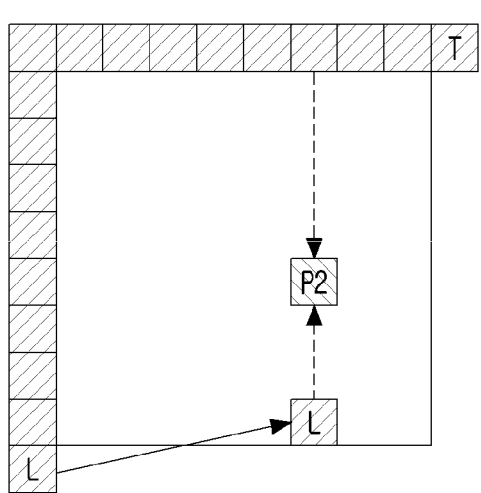

Meanwhile, in FIG. 10(*b*), a first partition and a second partition are defined by a partitioning line corresponding to mode #22 in FIG. 7 and distance 1 in FIG. 8, and the second partition and a third partition are defined by a partitioning line corresponding to mode #1 in FIG. 21 and distance 1 in FIG. 8.

Depending on whether partitioning lines cross each other, a block may be partitioned into three or four partitions. For example, as in the example shown in FIG. 10(*a*), if the two partitioning lines do not cross each other, the block can be partitioned into three partitions. On the other hand, if the two partitioning lines cross each other as in the example shown in FIG. 10(*b*), the block can be partitioned into four partitions.

Alternatively, under a predefined constraint, a block may be partitioned using a plurality of partitioning lines. The constraint may be that two partitioning lines do not cross each other. In this case, when the first partitioning line is selected, a partitioning line crossing the selected first partitioning line may not be selected as the second partitioning line according to the above constraint. That is, the number of at least one of modes or distances that can be selected as the second partitioning line can be adjusted by the preselected first partitioning line.

As another example, an angle range formed by the first partitioning line and the second partitioning line may be limited. For example, as in the example shown in FIG. 11, the angle between a straight line perpendicular to the first partitioning line (e.g., a partitioning line defining the first partition and the second partition) and a straight line perpendicular to the second partitioning line (e.g., a partitioning line defining the second partition and the third partition) at the center point of a block is assumed to be e.

The maximum size of θ may be adaptively determined based on at least one of the direction or distance of the first partitioning line, the size of the block, the area of the block, or the prediction mode applied to the block. Here, the prediction mode may indicate one of intra-prediction and inter-prediction. Alternatively, the prediction mode may indicate one of predefined intra-prediction modes or one of predefined inter-prediction modes. When the first partitioning line is selected, the number and/or range of partitioning direction candidates that can be selected as the second partitioning line may be determined by the maximum size of θ.

At the time of encoding the current picture, redundant data between pictures can be removed through inter-prediction. Inter-prediction can be performed on a block basis. Specifically, a prediction block for the current block can be generated from a reference picture using motion information of the current block. Here, the motion information may include at least one of a motion vector, a reference picture index, or a prediction direction.

The motion information of the current block can be generated through motion estimation.

Figure 12:
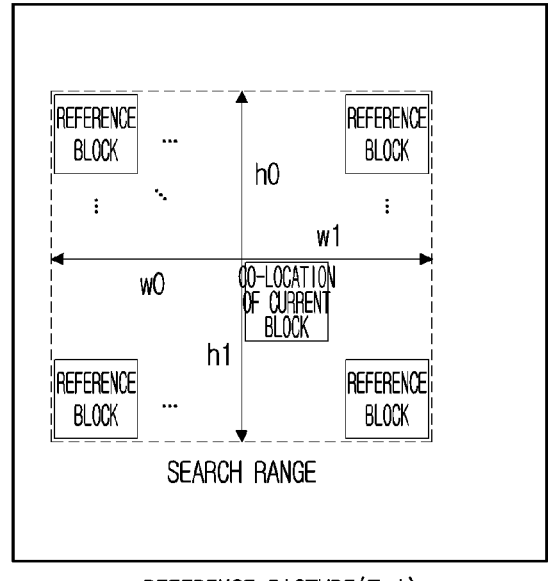
FIG. 12 shows an example in which motion estimation is performed.
Figure 12:
Figure 12:
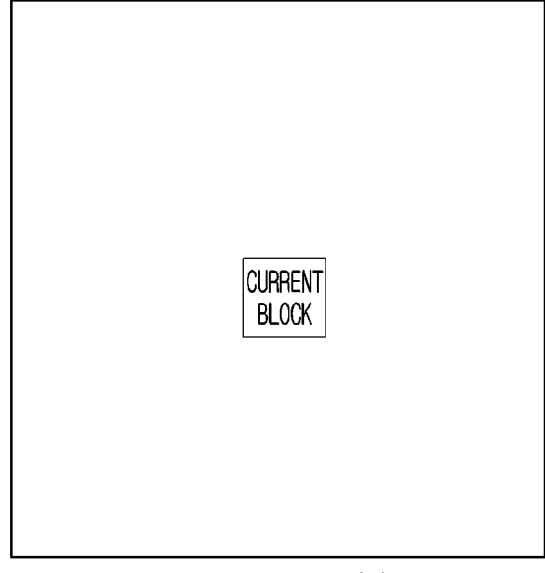

FIG. 12 shows an example in which motion estimation is performed.

In FIG. 12, it is assumed that the Picture Order Count (POC) of the current picture is T and the POC of a reference picture is (T-1).

A search range for motion estimation may be set from the same position as a reference point of the current block in the reference picture. Here, the reference point may be the position of the upper left sample of the current block.

As an example, FIG. 12 illustrates that a rectangle having a size of (w0+w01) and (h0+h1) is set as a search range with the reference point as a center. In this example, w0, w1, h0, and h1 may have the same value. Alternatively, at least one of w0, w1, h0, or h1 may be set to have a different value from the others. Alternatively, the sizes of w0, w1, h0, and h1 may be determined so as not to exceed a coding tree unit (CTU) boundary, a slice boundary, a tile boundary, or a picture boundary.

After setting reference blocks having the same size as the current block within the search range, a cost for each reference block with respect to the current block may be measured. The cost may be calculated using a similarity between two blocks.

As an example, the cost may be calculated on the basis of the absolute sum of difference values (SAD: Sum of Absolute Difference) between original samples in the current block and original samples (or reconstructed samples) in each reference block. As the absolute sum decreases, the cost can decrease.

After comparing the costs of the reference blocks, a reference block with the optimal cost can be set as a prediction block for the current block.

Additionally, the distance between the current block and the reference block can be set as a motion vector. Specifically, the x-coordinate difference and y-coordinate difference between the current block and the reference block may be set as a motion vector.

Furthermore, the index of a picture containing the reference block identified through motion estimation is set as a reference picture index.

Additionally, a prediction direction can be set on the basis of whether the reference picture belongs to an L0 reference picture list or an L1 reference picture list.

Further, motion estimation may be performed for each of an L0 direction and an L1 direction. If prediction is performed in both the L0 direction and the L1 direction, motion information in the L0 direction and motion information in the L1 direction can be generated.

Figure 13:
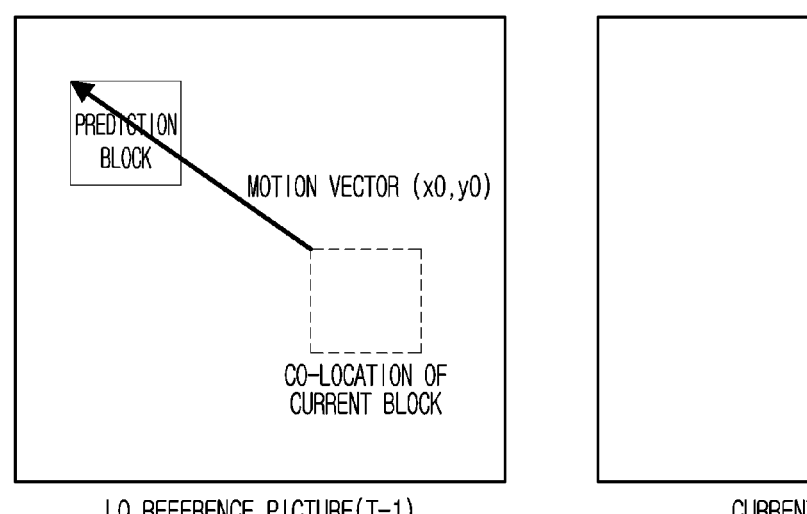
FIGS. 13 and 14 show an example in which a prediction block for a current block is generated on the basis of motion information generated through motion estimation.
Figure 14:
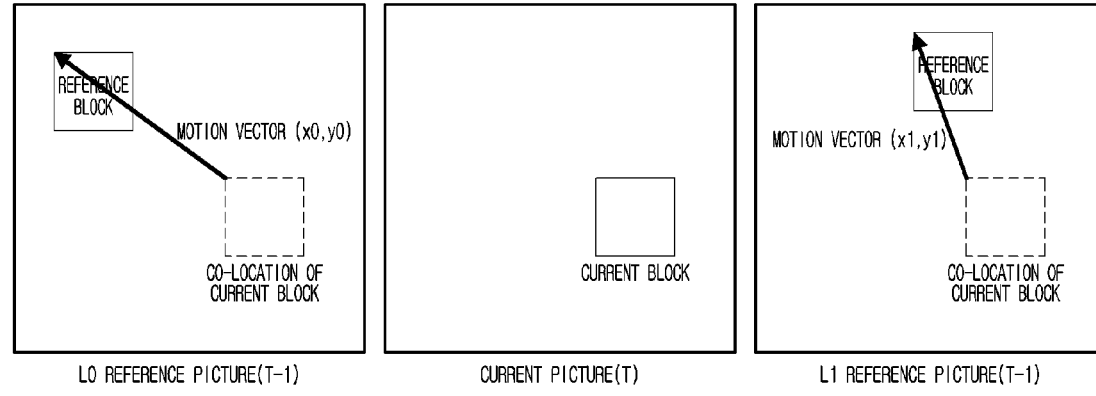

FIGS. 13 and 14 show an eCxample in which a prediction block for the current block is generated on the basis of motion information generated through motion estimation.

FIG. 13 shows an example of generating a prediction block through unidirectional (i.e., L0 direction) prediction, and FIG. 14 shows an example of generating a prediction block through bidirectional (i.e., L0 and L1 directions) prediction.

In the case of unidirectional prediction, a prediction block for the current block is generated using one piece of motion information. As an example, the motion information may include an L0 motion vector, an L0 reference picture index, and prediction direction information indicating the L0 direction.

In the case of bidirectional prediction, a prediction block is created using two pieces of motion information. As an example, a reference block in the L0 direction identified based on motion information on the L0 direction (L0 motion information) may be set as an L0 prediction block, and a reference block in the L1 direction identified based on motion information on the L1 direction (L1 motion information) may be set as an L1 prediction block. Thereafter, the L0 prediction block and the L1 prediction block can be subjected to weighted summation to generate a prediction block for the current block.

In the examples shown in FIGS. 12 to 14, the L0 reference picture is present before the current picture (i.e., the POC value is smaller than the current picture), and the L1 reference picture is present after the current picture (i.e., the POC value is greater than the current picture).

However, unlike the examples, the L0 reference picture may be present after the current picture, or the L1 reference picture may be present before the current picture. For example, both the L0 reference picture and the L1 reference picture may be present before the current picture, or both may be present after the current picture. Alternatively, bidirectional prediction may be performed using the L0 reference picture present after the current picture and the L1 reference picture present before the current picture.

Motion information of a block on which inter-prediction has been performed may be stored in a memory. In this case, the motion information may be stored in sample units. Specifically, motion information of a block to which a specific sample belongs may be stored as motion information of the specific sample. The stored motion information can be used to derive motion information of a neighboring block to be encoded/decoded later.

An encoder may signal information obtained by encoding a residual sample corresponding to the difference value between the sample (i.e., original sample) of the current block and the prediction sample and the motion information necessary to generate the prediction block to a decoder. The decoder may decode information on the signaled difference value to derive a difference sample, and add a prediction sample within the prediction block generated using motion information to the difference sample to generate a reconstructed sample.

Here, in order to effectively compress the motion information signaled to the decoder, one of a plurality of inter-prediction modes may be selected. Here, the plurality of inter-prediction modes may include a motion information merge mode and a motion vector prediction mode.

The motion vector prediction mode is a mode in which the difference value between a motion vector and a motion vector prediction value is encoded and signaled. Here, the motion vector prediction value may be derived based on motion information of neighboring blocks or neighboring samples adjacent to the current block.

Figure 15:
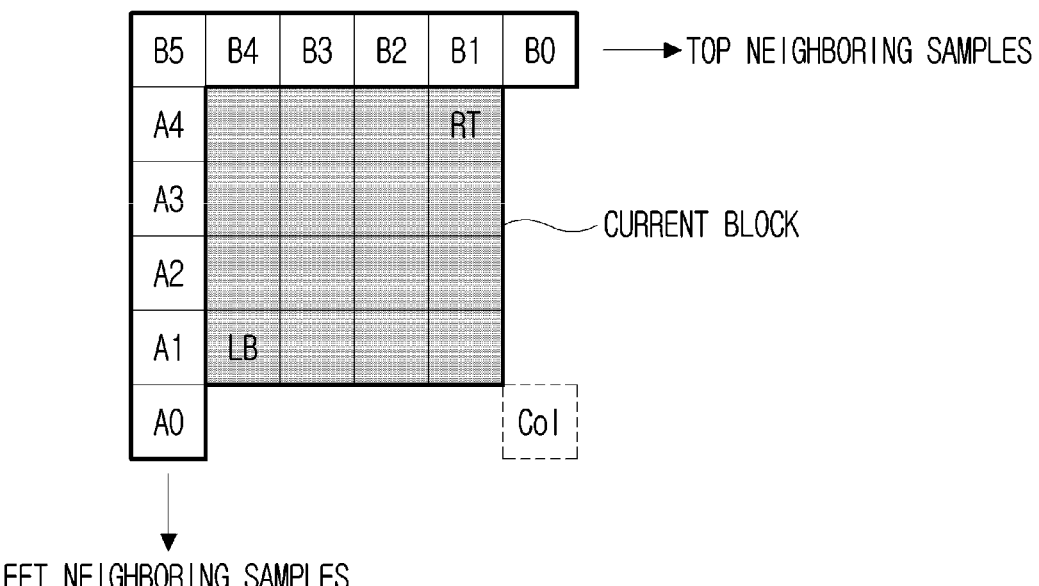
FIG. 15 shows positions referenced to derive a motion vector prediction value.

FIG. 15 shows positions referenced to derive a motion vector prediction value.

For convenience of description, it is assumed that the current block has a size of 4×4.

In the illustrated example, "LB" indicates a sample included in the leftmost column and bottommost row in the current block. "RT" indicates a sample included in the rightmost column and topmost row in the current block. A0 to A4 indicate samples neighboring the left of the current block, and B0 to B5 indicate samples neighboring the top of the current block. As an example, A1 indicates a sample neighboring the left of LB, and B1 indicates sample neighboring the top of RT. A neighboring block comprising a sample spatially adjacent to a current block (i.e., one of A0 to A4 or one, or one of B0 to B5) may be referred to as a spatial neighboring block.

Col indicates the position of a sample neighboring the bottom right of the current block in a co-located picture. The co-located picture is a different picture from the current picture, and information for identifying the co-located picture can be explicitly encoded and signaled in a bitstream. Alternatively, a reference picture with a predefined reference picture index may be set as a co-located picture. A neighboring block comprising a sample temporally adjacent to a current block (i.e., Col) may be referred to as a temporal neighboring block.

The motion vector prediction value of the current block may be derived from at least one motion vector prediction candidate included in a motion vector prediction list.

The number of motion vector prediction candidates that can be included in the motion vector prediction list (i.e., the size of the list) may be predefined in the encoder and decoder. As an example, the maximum number of motion vector prediction candidates may be two.

A motion vector stored at the position of a neighboring sample adjacent to the current block or a scaled motion vector derived by scaling the motion vector may be inserted into the motion vector prediction list as a motion vector prediction candidate. At this time, motion vector prediction candidates may be derived by scanning neighboring samples adjacent to the current block in a predefined order.

As an example, it can be checked whether a motion vector is stored at each position in the order from A0 to A4. According to this scan order, the first discovered available motion vector can be inserted into the motion vector prediction list as a motion vector prediction candidate.

As another example, it is checked whether a motion vector is stored at each location in the order from A0 to A4, and the first discovered motion vector corresponding to the position having the same reference picture as the current block may be inserted into the motion vector prediction list as a motion vector prediction candidate. If there is no neighboring sample having the same reference picture as the current block, a motion vector prediction candidate can be derived based on the first discovered available vector. Specifically, after scaling the first discovered available motion vector, the scaled motion vector can be inserted into the motion vector prediction list as a motion vector prediction candidate. Here, scaling may be performed on the basis of the output order difference between the current picture and the reference picture (i.e., POC difference) and the output order difference between the current picture and the reference picture of a neighboring sample (i.e., POC difference).

Furthermore, it is possible to check whether a motion vector is stored at each position in the order from B0 to B5. According to this scan order, the first discovered available motion vector can be inserted into the motion vector prediction list as a motion vector prediction candidate.

As another example, it is possible to check whether a motion vector is stored at each position in the order from B0 to B5, and the first discovered motion vector corresponding to the position having the same reference picture as the current block may be inserted into the motion vector prediction list as a motion vector prediction candidate. If there is no neighboring sample having the same reference picture as the current block, a motion vector prediction candidate can be derived based on the first discovered available vector. Specifically, after scaling the first discovered available motion vector, the scaled motion vector can be inserted into the motion vector prediction list as a motion vector prediction candidate. Here, scaling may be performed on the basis of the output order difference between the current picture and the reference picture (i.e., POC difference) and the output order difference between the current picture and the reference picture of a neighboring sample (i.e., POC difference).

If the motion vector is stored in a unit of block (e.g., 4×4), a motion vector predictor candidate may be derived based on a motion vector of a block including a sample at a predefined position.

As in the above-described example, a motion vector prediction candidate can be derived from a sample adjacent to the left of the current block, and a motion vector prediction candidate can be derived from a sample adjacent to the top of the current block.

Here, the motion vector prediction candidate derived from the left sample may be inserted into the motion vector prediction list prior to the motion vector prediction candidate derived from the top sample. In this case, the index assigned to the motion vector prediction candidate derived from the left sample may have a smaller value than the index assigned to the motion vector prediction candidate derived from the top sample.

On the other hand, the motion vector prediction candidate derived from the top sample may be inserted into the motion vector prediction list prior to the motion vector prediction candidate derived from the left sample.

Among motion vector prediction candidates included in the motion vector prediction list, a motion vector prediction candidate with the highest coding efficiency may be set as a motion vector predictor (MVP) of the current block. Additionally, index information indicating the motion vector prediction candidate that is set as the motion vector predictor of the current block among the plurality of motion vector prediction candidates may be encoded and signaled to the decoder. When the number of motion vector prediction candidates is two, the index information may be a 1-bit flag (e.g., MVP flag). Additionally, a motion vector difference (MVD), which is the difference between the motion vector of the current block and the motion vector predictor, can be encoded and signaled to the decoder.

The decoder can construct a motion vector prediction list in the same way as the encoder. Additionally, the decoder may decode index information from a bitstream and select one of a plurality of motion vector prediction candidates on the basis of the decoded index information. The selected motion vector prediction candidate can be set as the motion vector predictor of the current block.

Additionally, the decoder may decode a motion vector difference from the bitstream. Thereafter, the decoder may derive the motion vector of the current block by summing the motion vector predictor and the motion vector difference.

In a case where bidirectional prediction is applied to the current block, a motion vector prediction list can be generated for each of the L0 direction and L1 direction. That is, a motion vector prediction list may be composed of motion vectors in the same direction. Accordingly, the motion vector of the current block and the motion vector prediction candidates included in the motion vector prediction list have the same direction.

In a case where the motion vector prediction mode is selected, a reference picture index and prediction direction information may be explicitly encoded and signaled to the decoder. As an example, in a case where a plurality of reference pictures is present in a reference picture list and motion estimation is performed on each of the plurality of reference pictures, a reference picture index for identifying a reference picture from which the motion information of the current block is derived among the plurality of reference pictures can be explicitly encoded and signaled to the decoder.

At this time, if the reference picture list includes only one reference picture, encoding/decoding of the reference picture index may be omitted.

Prediction direction information may be an index indicating of one L0 unidirectional prediction, L1 unidirectional prediction, or bidirectional prediction. Alternatively, an L0 flag indicating whether prediction in the L0 direction is performed and an L1 flag indicating whether prediction in the L1 direction is performed may be encoded and signaled.

The motion information merge mode is a mode in which the motion information of the current block is set to be the same as motion information of a neighboring block. In the motion information merge mode, motion information can be encoded/decoded using a motion information merge list.

A motion information merge candidate may be derived based on motion information of a neighboring block or neighboring sample adjacent to the current block. For example, a reference position around the current block may be predefined, and then whether motion information is present at the predefined reference position may be checked. If motion information is present at the predefined reference position, the motion information at the position can be inserted into the motion information merge list as a motion information merge candidate.

In the example of FIG. 15, the predefined reference position may include at least one of A0, A1, B0, B1, B5, or Col. Furthermore, motion information merge candidates can be derived in the order of A1, B1, B0, A0, B5, and Col.

If the motion information is stored in a unit of block (e.g., 4×4), a motion information merge candidate may be derived based on a block including a sample at a pre-defined reference position.

Among motion information merge candidates included in the motion information merge list, motion information of a motion information merge candidate with the optimal cost can be set as motion information of the current block. Furthermore, index information (e.g., merge index) indicating a motion information merge candidate selected from among the plurality of motion information merge candidates may be encoded and transmitted to the decoder.

In the decoder, a motion information merge list can be constructed in the same way as in the encoder. Then, a motion information merge candidate can be selected on the basis of a merge index decoded from a bitstream. Motion information of the selected motion information merge candidate may be set as motion information of the current block.

Unlike the motion vector prediction list, the motion information merge list s configured as a single list regardless of the prediction direction. That is, motion information merge candidates included in the motion information merge list may have only L0 motion information or L1 motion information, or may have bidirectional motion information (i.e., L0 motion information and L1 motion information).

The motion information of the current block may also be derived using a reconstructed sample area around the current block. Here, the reconstructed sample area used to derive the motion information of the current block may be called a template.

Figure 16:
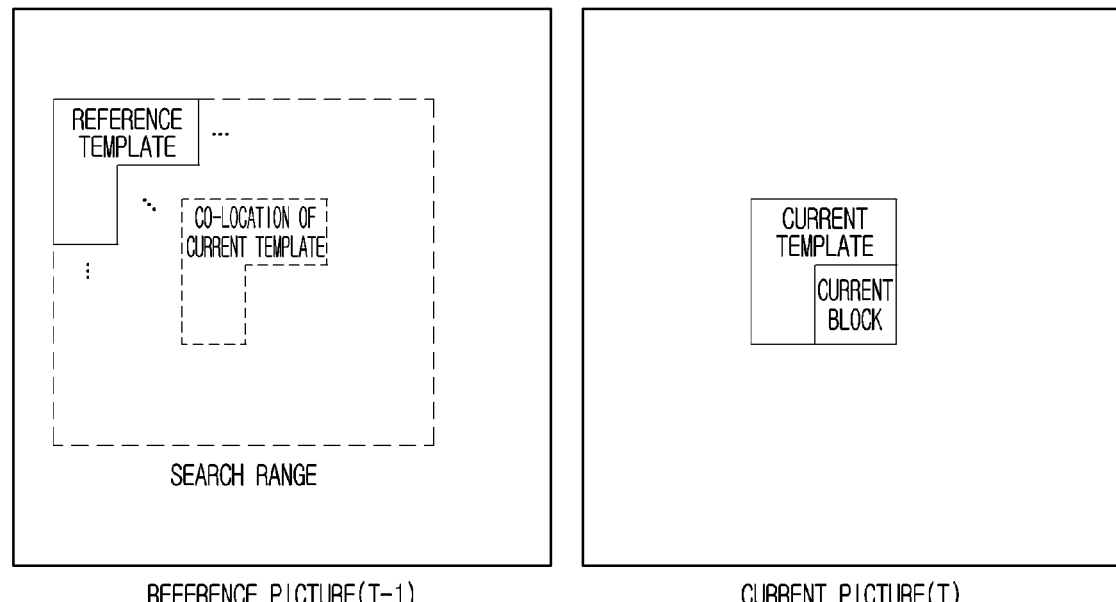
FIG. 16 is a diagram illustrating a template-based motion estimation method.

FIG. 16 is a diagram illustrating a template-based motion estimation method.

In FIG. 12, a prediction block for the current block is determined based on the cost between the current block and the reference block within the search range. According to the present embodiment, unlike the example shown in FIG. 12, motion estimation for the current block can be performed on the basis of the cost between a template neighboring the current block (hereinafter referred to as a current template) and a reference template having the same size and shape as the current template.

As an example, the cost may be calculated on the basis of the absolute sum of differences between reconstructed samples in the current template and reconstructed samples in a reference block. As the absolute sum decreases, the cost can be decreased.

Upon determination of the current template within a search range and a reference template having the optimal cost, a reference block neighboring the reference template can be set as a prediction block for the current block.

Additionally, motion information of the current block can be set on the basis of the distance between the current block and the reference block, the index of the picture to which the reference block belongs, and whether the reference picture is included in the L0 or L1 reference picture list.

Since a previously reconstructed area around the current block is defined as a template, the decoder can perform motion estimation in the same manner as the encoder. Accordingly, in a case where motion information is derived using a template, it is not necessary to encode and signal motion information other than information indicating whether the template is used.

The current template may include at least one of an area adjacent to the top of the current block or an area adjacent to the left side of the current block. Here, the area adjacent to the top may include at least one row, and the area adjacent to the left side may include at least one column.

Figure 17:
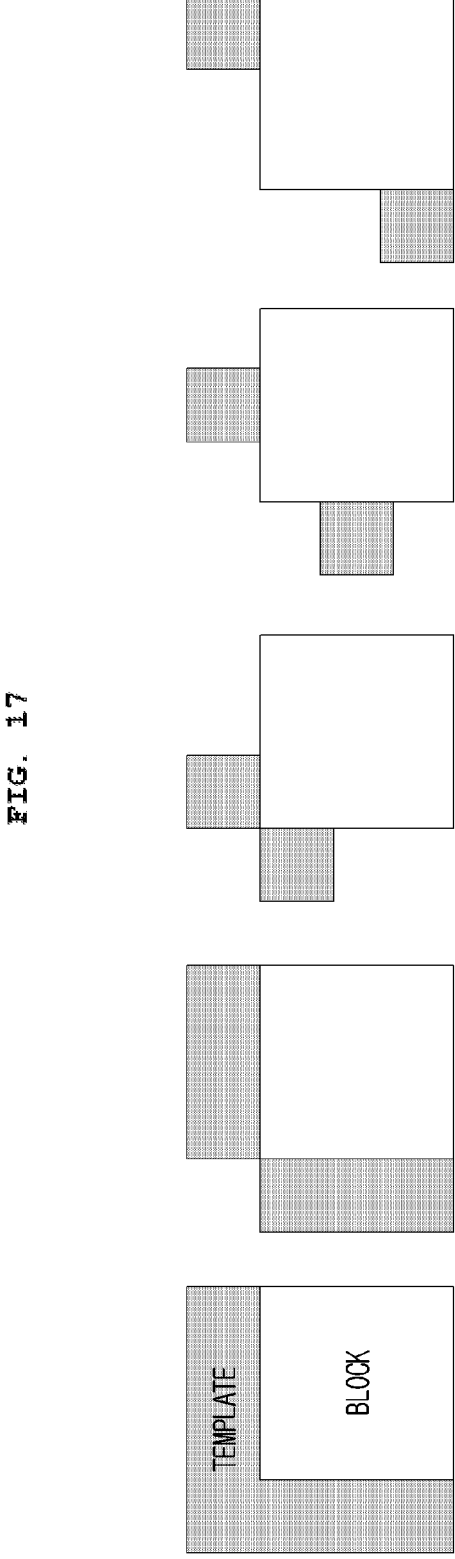
FIG. 17 shows examples of template configuration.

FIG. 17 shows examples of template configuration.

A current template may be constructed according to one of the examples shown in FIG. 17.

Alternatively, unlike the examples shown in FIG. 17, the template may be constructed using only the area adjacent to the left side of the current block or using only the area adjacent to the top of the current block.

The size and/or shape of the current template may be predefined in the encoder and the decoder.

Alternatively, a plurality of template candidates having different sizes and/or shapes may be predefined, and then index information for identifying one of the plurality of template candidates may be encoded and signaled to the decoder.

Alternatively, one of a plurality of template candidates may be adaptively selected on the basis of at least one of the size, shape, or position of the current block. For example, if the current block comes into contact with the upper boundary of a CTU, the current template can be constructed using only the area adjacent to the left side of the current block.

Template-based motion estimation can be performed on each reference picture stored in the reference picture list. Alternatively, motion estimation may be performed on only some reference pictures. As an example, motion estimation may be performed only on a reference picture with a reference picture index of 0, or motion estimation may be performed only on reference pictures having reference picture indices less than a threshold value or reference pictures whose POC differences from the current picture are less than a threshold value.

Alternatively, a reference picture index may be explicitly encoded and signaled, and then motion estimation may be performed only on the reference picture indicated by the reference picture index.

Alternatively, motion estimation may be performed on a reference picture of a neighboring block corresponding to the current template. For example, if the template is composed of a left neighboring area and a top neighboring area, at least one reference picture can be selected using at least one of the reference picture index of the left neighboring block or the reference picture index of the top neighboring block. Thereafter, motion estimation can be performed on at least one selected reference picture.

Information indicating whether template-based motion estimation has been applied may be encoded and signaled to the decoder. The information may be a 1-bit flag. For example, if the flag is true (1), it indicates that template-based motion estimation has been applied to the L0 direction and L1 direction of the current block. On the other hand, if the flag is false (0), it indicates that template-based motion estimation has not been applied. In this case, motion information of the current block may be derived on the basis of the motion information merge mode or the motion vector prediction mode.

On the other hand, template-based motion estimation can be applied only in a case where it is determined that the motion information merge mode and motion vector prediction mode have not been applied to the current block. For example, when a first flag indicating whether the motion information merge mode has been applied and a second flag indicating whether the motion vector prediction mode has been applied are both 0, template-based motion estimation can be performed.

For each of the L0 direction and the L1 direction, information indicating whether template-based motion estimation has been applied may be signaled. That is, whether template-based motion estimation is applied to the L0 direction and whether template-based motion estimation is applied to the L1 direction may be determined independently of each other. Accordingly, template-based motion estimation can be applied to one of the L0 direction and the L1 direction, whereas another mode (e.g., the motion information merge mode or the motion vector prediction mode) can be applied to the other direction.

When template-based motion estimation is applied to both the L0 direction and the L1 direction, a prediction block for the current block may be generated on the basis of a weighted sum operation of an L0 prediction block and an L1 prediction block. Alternatively, even when template-based motion estimation is applied to one of the L0 direction and the L1 direction but another mode is applied to the other, a prediction block for the current block may be generated on the basis of a weighted sum operation of the L0 prediction block and the L1 prediction block. This will be described later using Equation 2.

Alternatively, a template-based motion estimation method may be inserted as a motion information merge candidate in the motion information merge mode or a motion vector prediction candidate in the motion vector prediction mode. In this case, whether to apply the template-based motion estimation method may be determined on the basis of whether a selected motion information merge candidate or a selected motion vector prediction candidate indicates the template-based motion estimation method.

Motion information of the current block may also be generated on the basis of a bidirectional matching method.

Figure 18:
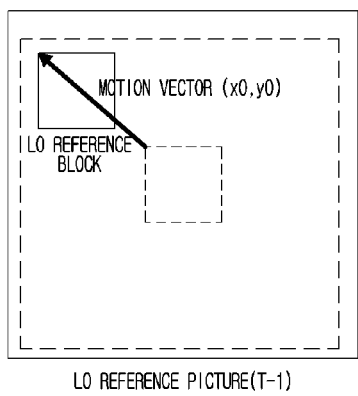
FIG. 18 is a diagram illustrating a motion estimation method based on a bidirectional matching method.
Figure 18:
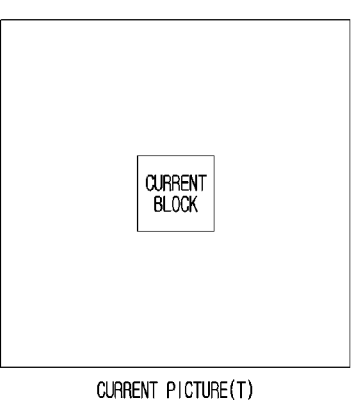
Figure 18:
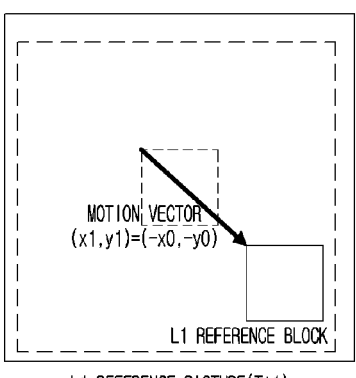

FIG. 18 is a diagram illustrating a motion estimation method based on a bidirectional matching method.

The bidirectional matching method can be performed only when the temporal order (i.e., POC) of the current picture is present between the temporal order of an L0 reference picture and the temporal order of an L1 reference picture.

When the bidirectional matching method is applied, a search range can be set for each of the L0 reference picture and the L1 reference picture. At this time, the L0 reference picture index for identifying the L0 reference picture and the L1 reference picture index for identifying the L1 reference picture may be encoded and signaled.

As another example, only the L0 reference picture index may be encoded and signaled, and an L1 reference picture may be selected on the basis of the distance between the current picture and the L0 reference picture (hereinafter referred to as an L0 POC difference). As an example, among L1 reference pictures included in the L1 reference picture list, an L1 reference picture for which the absolute value of the distance from the current picture (hereinafter referred to as an L1 POC difference) is the same as the absolute value of the distance between the current picture and the L0 reference picture may be selected. If there is no L1 reference picture having the same L1 POC difference as the L0 POC difference, an L1 reference picture having an L1 POC difference most similar to the L0 POC difference may be selected from among the L1 reference pictures.

Here, among the L1 reference pictures, only an L1 reference picture having a different temporal direction from the L0 reference picture can be used for bidirectional matching. For example, if the POC of the L0 reference picture is smaller than that of the current picture, one of L1 reference pictures having POCs greater than that of the current picture can be selected.

On the other hand, only the L1 reference picture index may be encoded and signaled, and an L0 reference picture may be selected on the basis of the distance between the current picture and the L1 reference picture.

Alternatively, the bidirectional matching method may be performed using an L0 reference picture closest in distance to the current picture among L0 reference pictures and an L1 reference picture closest in distance to the current picture among L0 reference pictures.

Alternatively, the bidirectional matching method may also be performed using an L0 reference picture to which a predefined index (e.g., index 0) is assigned in the L0 reference picture list and an L1 reference picture to which a predefined index (e.g., index 0) is assigned in the L1 reference picture list.

Alternatively, an LX (X being 0 or 1) reference picture may be selected based on an explicitly signaled reference picture index, and a reference picture closest to the current picture among L|X−1| reference pictures, or a reference picture having a predefined index in an L|X−1| reference picture list may be selected as an L|X−1| reference picture.

As another example, an L0 reference picture and/or an L1 reference picture may be selected on the basis of motion information of a neighboring block of the current block. As an example, an L0 reference picture and/or an L1 reference picture to be used for bidirectional matching may be selected using the reference picture index of the left or top neighboring block of the current block.

A search range may be set within a predetermined range from a co-located block in a reference picture.

As another example, the search range may be set on the basis of initial motion information. The initial motion information may be derived from a neighboring block of the current block. For example, motion information of the left neighboring block or the top neighboring block of the current block may be set as the initial motion information of the current block.

In a case where the bidirectional matching method is applied, an L0 motion vector and an L1 motion vector are set in opposite directions. This indicates that the L0 motion vector and the L1 motion vector have opposite signs. In addition, the size of an LX motion vector may be proportional to the distance (i.e., POC difference) between the current picture and an LX reference picture.

Thereafter, motion estimation can be performed using a cost between a reference block within the search range of L0 reference pictures (hereinafter referred to as an L0 reference block) and a reference block within the search range of L1 reference pictures (hereinafter referred to as an L1 reference block).

If an L0 reference block for which a vector with respect to the current block is (x, y) is selected, an L1 reference block located at a distance of (−Dx, −Dy) from the current block can be selected. Here, D can be determined by the ratio of the distance between the current picture and the L0 reference picture to the distance between the L1 reference picture and the current picture.

For example, in the example shown in FIG. 18, the absolute value of the distance between the current picture T and the L0 reference picture T-1 is the same as absolute value of the distance between the current picture T and the L1 reference picture T+1. Accordingly, in the illustrated example, the L0 motion vector (x0, y0) and the L1 motion vector (x1, y1) have the same size but opposite directions. If an L1 reference picture with a POC of (T+2) has been used, the L1 motion vector (x1, y1) is set to (−2*x0, −2*y0).

Upon selection of an L0 reference block and an L1 reference block with an optimal cost, the L0 reference block and the L1 reference block can be set as an L0 prediction block and an L1 prediction block for the current block. Thereafter, the final prediction block for the current block can be generated through a weighted sum operation of the L0 reference block and the L1 reference block. As an example, a prediction block for the current block may be generated according to Equation 2 which will be described later.

When the bidirectional matching method is applied, the decoder can perform motion estimation in the same way as the encoder. Accordingly, information indicating whether the bidirectional motion matching method is applied is explicitly encoded/decoded, while encoding/decoding of motion information such as motion vectors can be omitted. As described above, at least one of the L0 reference picture index or the L1 reference picture index may be explicitly encoded/decoded.

As another example, information indicating whether the bidirectional matching method has been applied may be explicitly encoded/decoded, and when the bidirectional matching method has been applied, the L0 motion vector or the L1 motion vector may be explicitly encoded and signaled. In a case where the L0 motion vector has been signaled, the L1 motion vector can be derived on the basis of the POC difference between the current picture and the L0 reference picture and the POC difference between the current picture and the L1 reference picture. In a case where the L1 motion vector has been signaled, the L0 motion vector can be derived on the basis of the POC difference between the current picture and the L0 reference picture and the POC difference between the current picture and the L1 reference picture. At this time, the encoder can explicitly encode the smaller one of the L0 motion vector and the L1 motion vector.

The information indicating whether the bidirectional matching method has been applied may be a 1-bit flag. As an example, if the flag is true (e.g., 1), it can indicate that the bidirectional matching method has been applied to the current block. If the flag is false (e.g., 0), it can indicate that the bidirectional matching method has not been applied to the current block. In this case, the motion information merge mode or the motion vector prediction mode may be applied to the current block.

On the other hand, the bidirectional matching method can be applied only in a case where it is determined that the motion information merge mode and the motion vector prediction mode are not applied to the current block. For example, when the first flag indicating whether the motion information merge mode is applied and the second flag indicating whether the motion vector prediction mode is applied are both 0, the bidirectional matching method can be applied.

Alternatively, the bidirectional matching method may be inserted as a motion information merge candidate in the motion information merge mode or a motion vector prediction candidate in the motion vector prediction mode. In this case, whether to apply the bidirectional matching method may be determined on the basis of whether a selected motion information merge candidate or a selected motion vector prediction candidate indicates the bidirectional matching method.

An example in which the temporal order of the current picture needs to be present between the temporal order of the L0 reference picture and the temporal order of the L1 reference picture in the bidirectional matching method has been described. It is also possible to generate a prediction block for the current block by using a unidirectional matching method to which the above constraints of the bidirectional matching method are not applied. Specifically, in the unidirectional matching method, two reference pictures having a temporal order (i.e., POC) smaller than that of the current block or two reference pictures having a temporal order greater than that of the current block can be used. Here, both the two reference pictures may be derived from the L0 reference picture list or the L1 reference picture list. Alternatively, one of the two reference pictures may be derived from the L0 reference picture list, and the other may be derived from the L1 reference picture list.

Figure 19:
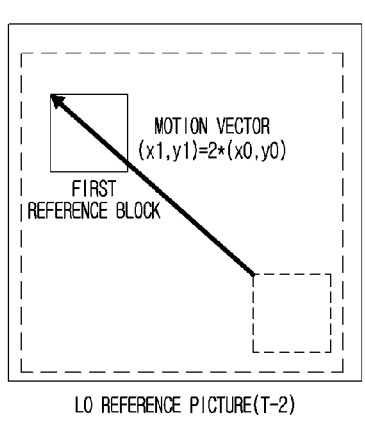
FIG. 19 is a diagram illustrating a motion estimation method based on a unidirectional matching method.
Figure 19:
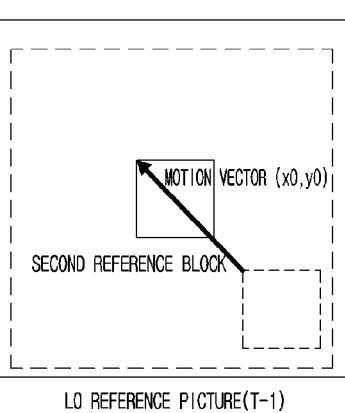
Figure 19:
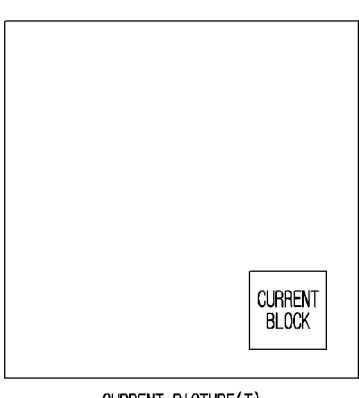

FIG. 19 is a diagram illustrating a motion estimation method based on the unidirectional matching method.

The unidirectional matching method can be performed based on two reference pictures (i.e., forward reference pictures) having a POC smaller than that of the current picture or two reference pictures (i.e., backward reference pictures) having a POC larger than that of the current picture. FIG. 19 illustrates that motion estimation based on the unidirectional matching method is performed on the basis of a first reference picture T-1 and a second reference picture T-2 having POCs smaller than that of the current picture T.

Here, the first reference picture index for identifying the first reference picture and the second reference picture index for identifying the second reference picture may be encoded and signaled. Among the two reference pictures used for the unidirectional matching method, a reference picture having a smaller POC difference from the current picture can be set as the first reference picture. Accordingly, when the first reference picture is selected, only a reference picture having a larger POC difference from the current picture than the first reference picture can be set as the second reference picture. The second reference picture index can be set such that it indicates one of rearranged reference pictures that have the same temporal direction as the first reference picture and have larger POC differences from the current picture than the first reference picture.

On the other hand, a reference picture having a larger POC difference from the current picture among the two reference pictures may be set as the first reference picture. In this case, the second reference picture index can be set such that it indicates one of rearranged reference pictures that have the same temporal direction as the first reference picture and have smaller POC differences from the current picture than the first reference picture.

Alternatively, the unidirectional matching method may be performed using a reference picture to which a predefined index in the reference picture list is assigned and a reference picture having the same temporal direction as this reference picture. As an example, a reference picture with an index of 0 in the reference picture list may be set as the first reference picture, and a reference picture with the smallest index among reference pictures having the same temporal direction as the first reference picture in the reference picture list may be selected as the second reference picture.

Both the first reference picture and the second reference picture can be selected from the L0 reference picture list or the L1 reference picture list. FIG. 19 illustrates that two L0 reference pictures are used for the unidirectional matching method. Alternatively, the first reference picture may be selected from the L0 reference picture list and the second reference picture may be selected from the L1 reference picture list.

Information indicating whether the first reference picture and/or the second reference picture belong to the L0 reference picture list or the L1 reference picture list may be additionally encoded/decoded.

Alternatively, unidirectional matching may be performed using one of the L0 reference picture list and the L1 reference picture list, which is set as default. Alternatively, two reference pictures may be selected from the L0 reference picture list and the L1 reference picture list, whichever has a larger number of reference pictures.

Thereafter, search ranges within the first reference picture and the second reference picture can be set.

The search ranges can be set within a predetermined range from the co-located block in the reference pictures.

As another example, the search ranges can be set on the basis of initial motion information. The initial motion information may be derived from a neighboring block of the current block. For example, motion information of the left neighboring block or the top neighboring block of the current block may be set as the initial motion information of the current block.

Thereafter, motion estimation can be performed using the cost between the first reference block within the search range of the first reference picture and the second reference block within the search range of the second reference picture.

At this time, in the unidirectional matching method, the size of a motion vector needs to be set to increase in proportion to the distance between the current picture and a reference picture. Specifically, in a case where the first reference block for which a vector with respect to the current picture is (x, y) is selected, the second reference block needs to be spaced apart from the current block by (Dx, Dy). Here, D can be determined by the ratio of the distance between the current picture and the first reference picture to the distance between the current picture and the second reference picture.

For example, in the example of FIG. 19, the distance (i.e., POC difference) between the current picture and the first reference picture is 1 and the distance (i.e., POC difference) between the current picture and the second reference picture is 2. Accordingly, when the first motion vector for the first reference block in the first reference picture is (x0, y0), the second motion vector (x1, y1) for the second reference block in the second reference picture can be set to (2×0, 2y0).

When the first reference block and the second reference block with the optimal cost are selected, the first reference block and the second reference block can be set as first and second prediction blocks for the current block. Thereafter, the final prediction block for the current block can be generated through a weighted sum operation of the first prediction block and the second prediction block. As an example, a prediction block for the current block can be generated according to Equation 2 which will be described later.

In a case where the unidirectional matching method is applied, the decoder can perform motion estimation in the same way as the encoder. Accordingly, information indicating whether the unidirectional motion matching method is applied is explicitly encoded/decoded, while encoding/decoding of motion information such as motion vectors can be omitted. As described above, at least one of the first reference picture index or the second reference picture index may be explicitly encoded/decoded.

As another example, information indicating whether the unidirectional matching method has been applied may be explicitly encoded/decoded, and in a case where the unidirectional matching method has been applied, the first motion vector or the second motion vector may be explicitly encoded and signaled. In a case where the first motion vector has been signaled, the second motion vector may be derived on the basis of the POC difference between the current picture and the first reference picture and the POC difference between the current picture and the second reference picture. In a case where the second motion vector has been signaled, the first motion vector may be derived on the basis of the POC difference between the current picture and the first reference picture and the POC difference between the current picture and the second reference picture. At this time, the encoder can explicitly encode the smaller one of the first motion vector and the second motion vector.

The information indicating whether the unidirectional matching method has been applied may be a 1-bit flag. As an example, if the flag is true (e.g., 1), it can indicate that the unidirectional matching method is applied to the current block. If the flag is false (e.g., 0), it can indicate that the unidirectional matching method is not applied to the current block. In this case, the motion information merge mode or the motion vector prediction mode can be applied to the current block.

On the other hand, the unidirectional matching method may be applied only in a case where it is determined that the motion information merge mode and the motion vector prediction mode are not applied to the current block. For example, when the first flag indicating whether the motion information merge mode is applied and the second flag indicating whether the motion vector prediction mode is applied are both 0, the unidirectional matching method can be applied.

Alternatively, the unidirectional matching method may be inserted as a motion information merge candidate in motion information merge mode or a motion vector prediction candidate in motion vector prediction mode. In this case, whether to apply the unidirectional matching method may be determined based on whether the selected motion information merge candidate or the selected motion vector prediction candidate indicates the unidirectional matching method.

Intra-prediction is a method of obtaining a prediction block for the current block using reference samples having spatial similarity to the current block. Reference samples used for intra-prediction may be reconstructed samples. As an example, a previously reconstructed sample around the current block may be set as a reference sample. Alternatively, in a case where it is determined that a reconstructed sample at a specific position is unavailable, an adjacent reconstructed sample may be set as a reference sample at a specific position.

Unlike what has been described, an original sample may also be set as a reference sample.

As in the above-mentioned example, a method of performing motion estimation in the decoder in the same manner as that in the encoder, that is, at least one of the template-based motion estimation method, the bidirectional estimation method, or the unidirectional estimation method, may be defined as an inter-prediction mode. Here, in a case where a plurality of decoder-side motion estimation methods is defined as an inter-prediction mode, an index indicating one of the plurality of decoder-side motion estimation methods may be encoded and signaled along with a flag indicating whether a decoder-side motion estimation method is applied. As an example, an index indicating at least one of the template-based motion estimation method, the bidirectional estimation method, or the unidirectional estimation method may be encoded and signaled.

Intra-prediction may be performed based on at least one of a plurality of intra-prediction modes predefined in the encoder and decoder.

Figure 20:
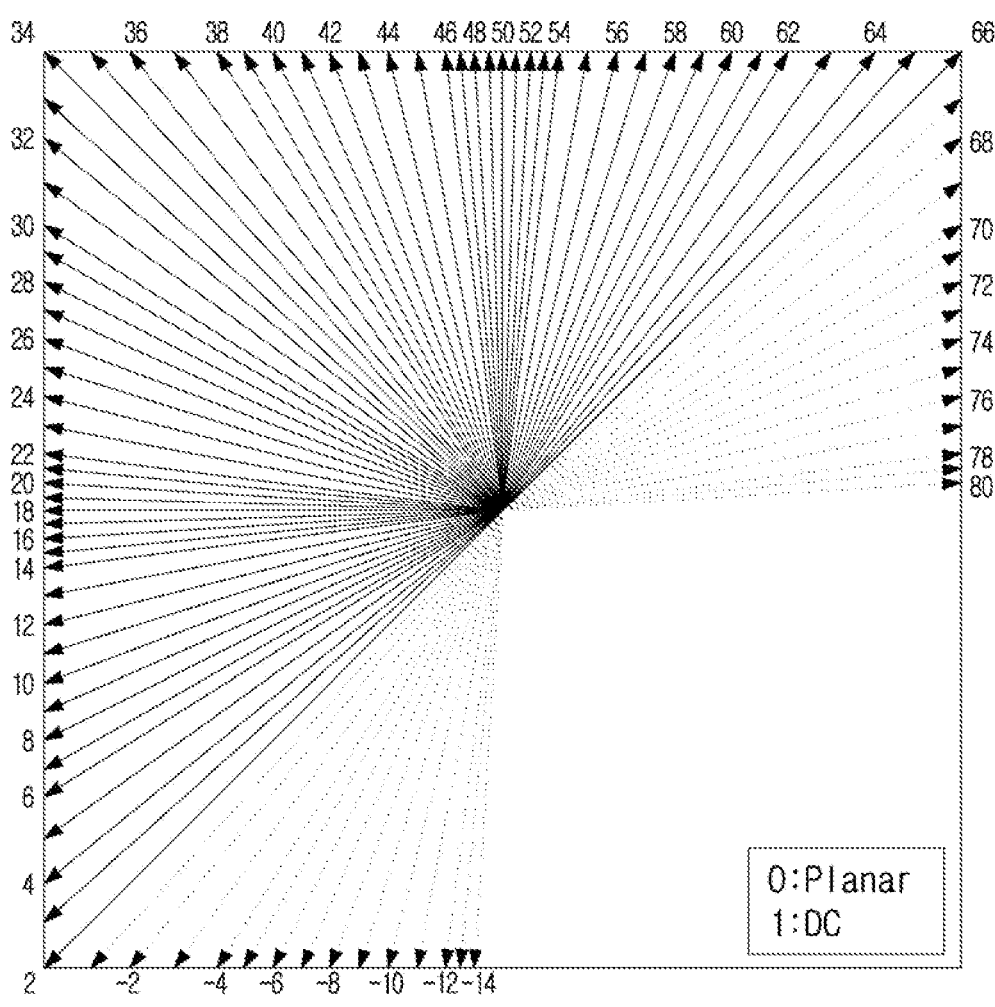
FIG. 20 shows predefined intra-prediction modes.

FIG. 20 shows predefined intra-prediction modes.

The intra-prediction modes predefined in the encoder and decoder may include non-directional intra-prediction modes and directional prediction modes. For example, in the example shown in FIG. 20, mode 0 represents a planar mode, which is a non-directional mode, and mode 1 represents a DC mode, which is a non-directional mode. Additionally, FIG. 20 illustrates 65 directional intra-prediction modes 2 to 66.

More or fewer intra-prediction modes than illustrated may be predefined in the encoder and decoder.

One of the predefined intra-prediction modes can be selected, and a prediction block for the current block can be obtained based on the selected intra-prediction mode. At this time, the number and positions of reference samples used to generate prediction samples within the prediction block may be adaptively determined according to the selected intra-prediction mode.

FIG. 21 shows an example in which a prediction sample is generated in the planar mode.

In the example shown in FIG. 21, when a prediction block is generated in the planar mode, a reference sample T adjacent to the upper right corner of the current block and a reference sample L adjacent to the lower left corner of the current block may be used.

P1 represents a prediction sample in the horizontal direction, and P2 represents a prediction sample in the vertical direction. P1 can be generated by linearly interpolating a reference sample having the same y coordinate as P1 (i.e., a reference sample located in the horizontal direction of P1) and the reference sample T. P2 can be generated by linearly interpolating the reference sample L and a reference sample having the same x coordinate as P2 (i.e., a reference sample located in the vertical direction of P2).

Thereafter, the final prediction sample can be obtained through a weighted sum operation of the horizontal prediction sample P1 and the vertical prediction sample P2. Equation 1 represents an example of generating the final prediction sample.

$$(\alpha \times P1 + \beta \times P2)/(\alpha + \beta) \qquad \text{[Equation 1]}$$

In equation 1, $\alpha$ indicates a weight assigned to the horizontal prediction sample P1 and $\beta$ indicates a weight assigned to the vertical prediction sample P2. The weights $\alpha$ and $\beta$ can be determined based on the width and height of the current block. Depending on the width and height of the current block, the weights $\alpha$ and $\beta$ may have the same value or different values. For example, if one side of the block is longer than the other side, the weight assigned to the prediction sample in the direction parallel to the long side can be set to have a larger value. Alternatively, on the other hand, the weight assigned to the prediction sample in the direction parallel to the long side may be set to have a smaller value.

Figure 22:
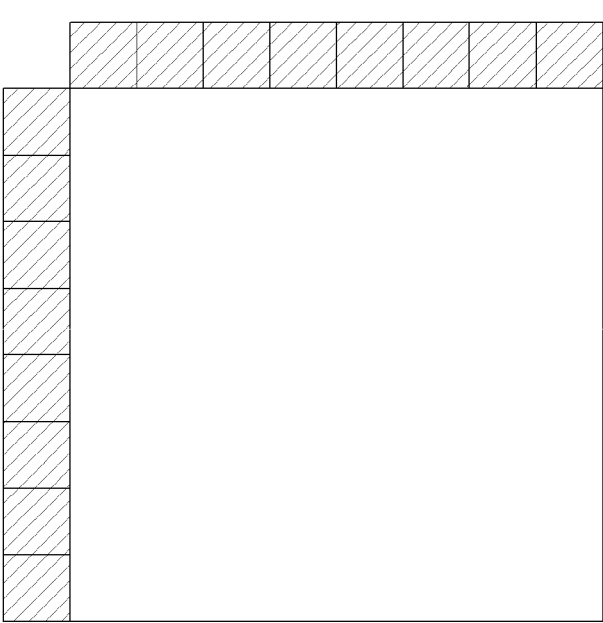
FIG. 22 shows an example in which a prediction sample is generated in a DC mode.
Figure 22:

FIG. 22 shows an example in which a prediction sample is generated in the DC mode.

In the DC mode, the average value of reference samples surrounding the current block can be calculated. FIG. 22 shows a range of reference samples used to calculate the average value. As in the example shown in FIG. 22, the average value can be calculated based on upper reference samples and left reference samples.

Depending on the type of the current block, the average value may be calculated using only the upper reference samples or only the left reference samples. For example, if the width of the current block is greater than the height, or if the ratio between the width and height of the current block is equal to or greater than (or less than) a predefined value, the average value can be calculated using only the upper reference samples.

On the other hand, if the width of the current block is smaller than the height, or if the ratio between the width and the height of the current block is less than (or greater than)

a predefined value, the average value can be calculated using only the left reference samples.

Figure 23:
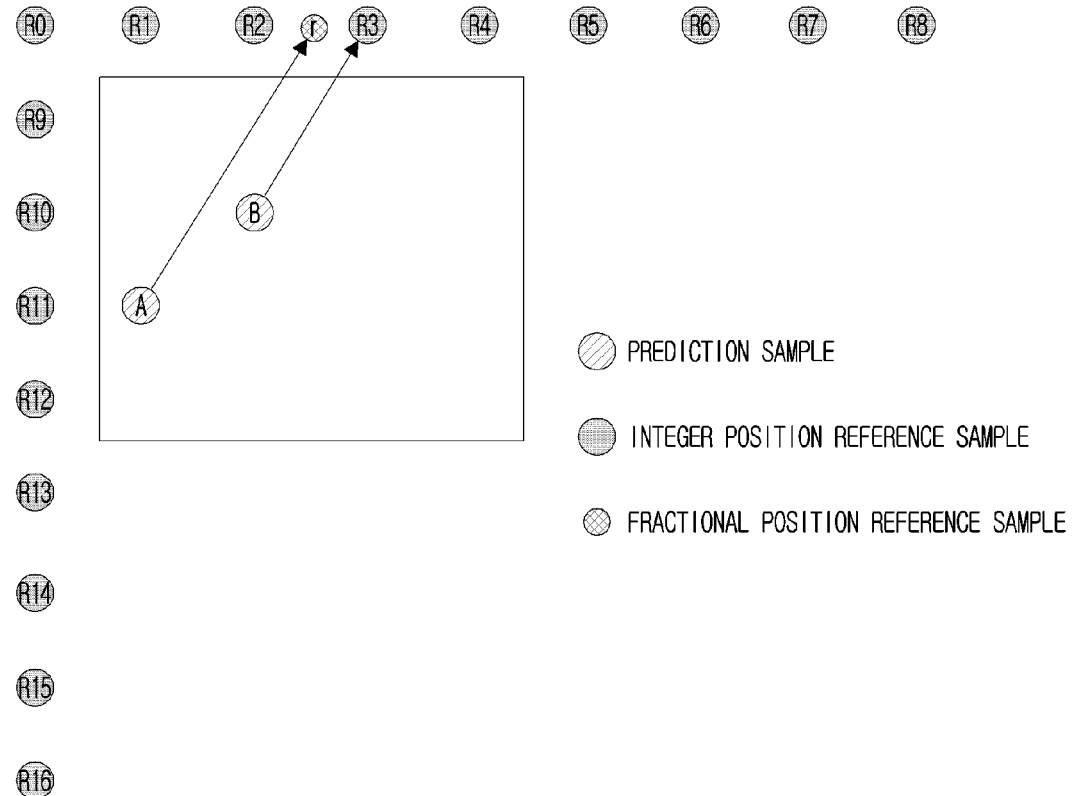
FIG. 23 shows an example in which a prediction sample is generated in a directional intra-prediction mode.

FIG. 23 shows an example in which a prediction sample is generated in the directional intra-prediction mode.

In a case where the directional intra-prediction mode is applied to the current block, projection can be performed at each sample position in the current block in the direction in which a reference sample is located according to the angle of the directional intra-prediction mode.

If a reference sample is present at the projected position (that is, if the projected position is an integer position of a reference sample), the reference sample at the corresponding position can be set as a prediction sample.

On the other hand, if there is no reference sample at the projected position (i.e., if the projected position is a fractional position of a reference sample), reference samples around the projected position can be interpolated and the interpolated value can be set as a prediction sample.

For example, in the example shown in FIG. 23, when projection based on the angle of the directional intra-prediction mode is performed at the position of a sample B in the current block, a reference sample R3 is present at the projected position. Accordingly, the reference sample R3 can be set as a prediction sample for the position of the sample B.

On the other hand, when projection based on the angle of the directional intra-prediction mode is performed at the position of a sample A in the current block, there is no reference sample at the projected position. In this case, integer position reference samples present around the projected position can be interpolated, and the interpolated value can be set as a prediction sample for the position of the sample A. Here, the value generated by interpolating integer position reference samples may be called a fractional position reference sample (r in FIG. 23).

Information on the intra-prediction mode of the current block can be encoded and signaled.

To this end, for the current block, an intra-prediction mode list including a plurality of intra-prediction mode candidates can be generated. Here, an intra-prediction mode candidate may be derived on the basis of the intra-prediction mode of a neighboring block adjacent to the current block or a predefined intra-prediction mode.

A flag indicating whether the intra-prediction mode of the current block is the same as one of a plurality of intra-prediction mode candidates included in the intra-prediction mode list may be explicitly encoded and signaled. If the intra-prediction mode of the current block is the same as one of the plurality of intra-prediction mode candidates, index information indicating one of the plurality of intra-prediction mode candidates may be explicitly encoded and signaled. On the other hand, if there is no intra-prediction mode candidate identical to the intra-prediction mode of the current block among the plurality of intra-prediction mode candidates, index information (i.e., residual mode information) indicating the intra-prediction mode of the current block among the remaining intra-prediction modes may be explicitly encoded and signaled.

Instead of an intra-prediction mode candidate, an intra-prediction mode prediction candidate may be used. In this case, the value indicated by the intra-prediction mode prediction candidate may be set as a prediction value for the intra-prediction mode of the current block.

Specifically, for the current block, an intra-prediction mode prediction list including a plurality of intra-prediction mode prediction candidates may be constructed. Here, the intra-prediction mode prediction candidates may be derived on the basis of the intra-prediction mode of a neighboring block adjacent to the current block or a predefined intra-prediction mode.

Thereafter, one of the plurality of intra-prediction mode prediction candidates can be set as an intra-prediction mode prediction value for the current block. When the intra-prediction mode prediction value is set, the difference between the intra-prediction mode of the current block and the intra-prediction mode prediction value can be derived. In this case, index information indicating one of the plurality of intra-prediction mode prediction candidates and information indicating the intra-prediction mode difference value may be explicitly encoded and signaled.

The intra-prediction mode of the current block can also be derived using a template. In this case, the decoder can also derive the intra-prediction mode in the same manner as the encoder. Accordingly, in a case where the intra-prediction mode is derived using a template, only information (e.g., a flag) indicating whether a template-based intra-prediction mode derivation method has been used is encoded/decoded, and encoding/decoding of information related to the intra-prediction mode list or intra-prediction mode prediction list may be omitted.

Figure 24:
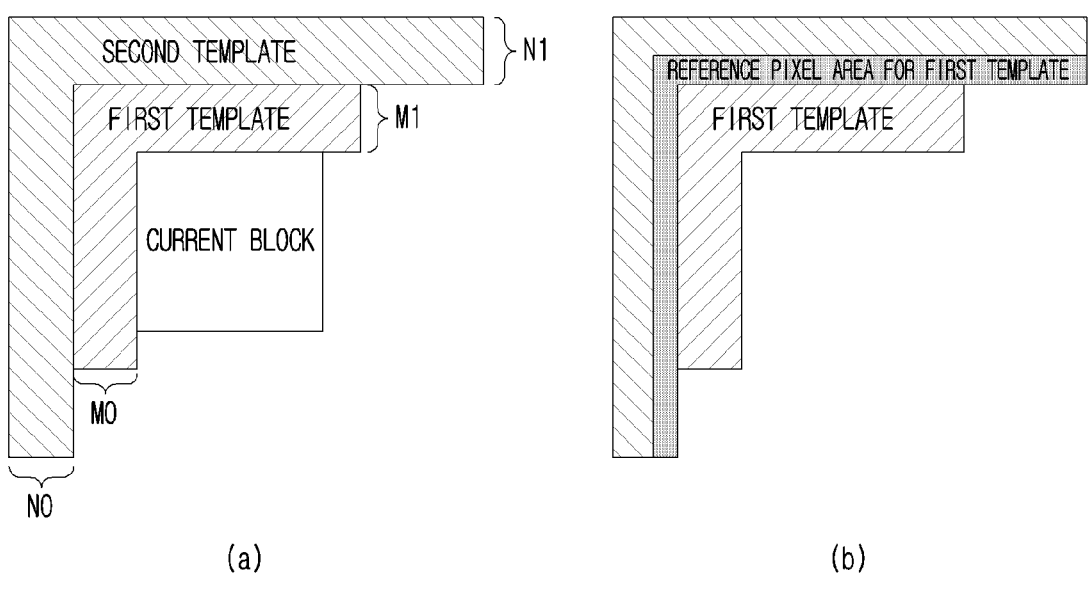
FIG. 24 shows an example in which an intra-prediction mode is derived using a template.

FIG. 24 shows an example in which an intra-prediction mode is derived using a template.

Reconstructed areas around the current block may be set as a first template, and reconstructed areas around the first template may be set as a second template. For example, in the example shown in FIG. 24(a), the first template may be composed of M0 reconstructed sample columns on the left side of the current block and M1 reconstructed sample rows on the top of the current block, and the second template may be composed of N0 reconstructed sample columns on the left side of the first template and N1 reconstructed sample rows on the top of the first template.

The width M0 and height M1 of the first template are natural numbers equal to or greater than 1 and may be set to the same value. Alternatively, depending on the type of the current block, it may be determined whether to set M0 and M1 to the same value. For example, M0 and M1 may be set to the same value if the current block has a square shape, whereas M0 and M1 may have different values if the current block has a non-square shape.

The width N0 and height N1 of the second template are natural numbers equal to or greater than 1 and may be set to the same value. Alternatively, depending on the type of the current block and M0 or M1, it may be determined whether to set N0 and N1 to the same value. For example, when M0 and M1 have different values, N0 and N1 may also be set to different values.

At least a part of the second template may be set as a reference area for the first template.

In a case where the second template is composed of one line, one line constituting the second template can be used as a reference area.

On the other hand, in a case where the second template is composed of a plurality of lines, at least one of the plurality of lines may be used as a reference area. In this case, information indicating a line used as a reference area among the plurality of lines may be encoded and signaled. For example, different indices may be assigned to the plurality of lines constituting the second template, and information indicating the index assigned to a line used as a reference area among the plurality of lines may be encoded. Here, the indices may be assigned on the basis of distances from the first template. As an example, a line with an index of 0 may be composed of the top row and the left column adjacent to the first template. A line with an index of N may be composed of a column with an x-axis coordinate difference N and a row with a y-axis coordinate difference N from a line with an index of 0.

Alternatively, a plurality of lines may be set as a reference area. In this case, a plurality pieces of index information may be encoded and signaled.

Alternatively, at least one of information indicating the position of a reference area (e.g., the distance between the reference area and the first template) or information indicating the size of the reference area (e.g., the width and/or height of the reference area) may be encoded and signaled.

Alternatively, a reference area may be set according to a rule predefined in the encoder and the decoder. For example, as in the example shown in FIG. 24(b), a line adjacent to the first template may be set as a reference pixel area.

Alternatively, a reference area may be adaptively determined on the basis of at least one of the size, shape, or partition type of the current block.

When the reference area is set, reference samples may be derived from reconstructed samples in the reference area, and prediction samples for the first template may be obtained on the basis of the derived reference samples. As an example, prediction samples for the first template may be obtained using the intra-prediction modes shown in FIG. 20 or some of the intra-prediction modes shown in FIG. 20.

Then, a cost for each intra-prediction mode may be calculated, and the intra-prediction mode with the optimal cost may be selected. Here, the cost may be calculated using the difference between a constructed sample (or original sample) in the first template and a prediction sample derived on the basis of reference samples belonging to the reference area. Specifically, the cost may be calculated by deriving differences between the reconstructed samples for respective positions in the first template and prediction sample and then summing the absolute values of the derived difference values.

Upon determination of the intra-prediction mode with the optimal cost, this intra-prediction mode can be set as the intra-prediction mode of the current block.

Alternatively, N intra-prediction modes may be selected from an intra-prediction mode with the lowest cost. Here, N may be a natural number of 1 or more. Upon selection of a plurality of intra-prediction modes, each of the plurality of intra-prediction modes can be set as an intra-prediction mode candidate. In this case, the intra-prediction mode of the current block may be set to be the same as one of the plurality of intra-prediction mode candidates.

Alternatively, N intra-prediction modes may be selected from an intra-prediction mode with the lowest cost, and then intra-prediction may be performed N times on the current block on the basis of each of the intra-prediction modes. A final prediction block for the current block may be generated by performing a weighted sum operation on the N prediction blocks obtained by performing intra-prediction N times.

For example, when two intra-prediction modes are selected, two prediction blocks can be generated through intra-prediction using each of the two intra-prediction modes. Thereafter, the final prediction block for the current block can be derived by performing a weighted sum operation on the two prediction blocks.

N may have a value predefined in the encoder and the decoder. Alternatively, N may be determined on the basis of at least one of the size, shape, or partition type of the current block, the type of the intra-prediction mode with the lowest cost, or a cost difference between the intra-prediction mode with the lowest cost and the intra-prediction mode with the next lowest cost.

For example, it may be determined whether to set N to 1 or a natural number of 2 or more on the basis of whether the intra-prediction mode with the lowest cost is a non-directional prediction mode one or of predefined directional prediction modes.

For example, N is set to 1 if the cost difference between the intra-prediction mode with the lowest cost and the intra-prediction mode with the next lowest cost does not exceed a threshold value, whereas N is set to a natural number of 2 or more otherwise.

Alternatively, after the encoder determines N, information for determining N may be explicitly encoded and signaled.

At the time of performing a weighted sum operation on N prediction blocks, a weight applied to each of the N prediction blocks may be derived on the basis of a weight list including a plurality of weight candidates. For example, when a weighted sum operation is performed on two prediction blocks, a weight indicated by a weight candidate selected from the weight list may be applied to the first prediction block. Additionally, a value derived by subtracting the weight applied to the first prediction block from a predetermined constant value may be set as a weight of the second prediction block.

In a case where a weight is determined using the weight list, index information indicating one of the plurality of weight candidates may be encoded and signaled.

Alternatively, the encoder and the decoder may perform a weighted sum operation on the N prediction blocks using predefined weights. As an example, an equal weight value may be applied to each of the N prediction blocks.

Alternatively, a weight for each prediction block may be determined on the basis of a ratio of costs. As an example, if a cost for the first intra-prediction mode calculated based on a template is cost1 and a cost for the second intra-prediction mode calculated based on the template is cost2, a weight of cost1/(cost1+cost2) may be applied to the second prediction block generated through the second intra-prediction mode, and a weight of cost2/(cost1+cost2) may be applied to the first prediction block generated through the first intra prediction mode.

Alternatively, the weight applied to each prediction block may be adaptively determined on the basis of at least one of whether the intra-prediction mode is a non-directional intra-prediction mode, whether the intra-prediction mode is one of predefined directional prediction modes, or the type of the intra-prediction mode.

As described above, a prediction block for the current block may be generated through inter-prediction or intra-prediction. At this time, inter-prediction may be performed on the basis of at least one of a plurality of inter-prediction modes, and the plurality of inter-prediction modes may include at least one of a motion vector merge mode, a motion vector prediction mode, a template-based motion estimation method, a bilateral matching method or a unidirectional matching method.

In the following embodiment, among the inter-prediction modes, an template-based motion estimation method, bidirectional matching method and/or unidirectional matching method) in which the decoder performs motion estimation in the same manner as the encoder to generate a prediction block will be referred to as a decoder-side motion estimation mode for convenience of description. In addition, among the inter-prediction modes, an inter-prediction mode (i.e., the motion information merge mode and/or the motion vector prediction inter-prediction mode (i.e., the mode) in which information generated through motion estimation in the encoder is explicitly encoded and signaled will be referred to as a motion information signaling mode.

When the motion information signaling mode is applied to the current block, motion information on the current block may be derived on the basis of a motion information merge candidate or a motion vector prediction candidate. For convenience of description, in the embodiment which will be described later, the motion information merge candidate and/or the motion vector prediction candidate will be referred to as motion information candidates, and the motion information merge list and/or the motion vector prediction list will be referred to as motion information list. That is, when the motion information merge mode is applied, a motion information candidate and a motion information list may mean a motion information merge candidate and a motion information merge list. On the other hand, when the motion vector prediction mode is applied, a motion information candidate and a motion information list may mean a motion vector prediction candidate and a motion vector prediction list.

In a case where the current block is partitioned into a plurality of partitions, inter-prediction or intra-prediction may be performed independently on each of the partitions. At this time, information indicating whether to partition the block into a plurality of partitions may be encoded and signaled to the decoder. At this time, partitioning the block into a plurality of partitions can be permitted only when at least one of the size, shape, intra-prediction mode, or inter-prediction mode of the current block satisfies predefined conditions. For example, at least one of a case where the size of the current block is greater than a threshold value, a case where the intra-prediction mode of the current block is not a non-directional prediction mode, a case where the intra-prediction mode of the current block is one of predefined directional prediction modes, a case where the motion information signaling mode is applied to the current block, or a case where the decoder-side motion estimation mode is applied to the current block may be set as the predefined conditions.

Hereinafter, execution of inter-prediction or intra-prediction when the current block is partitioned into a plurality of partitions will be described in detail with reference to the drawings.

Figure 25:
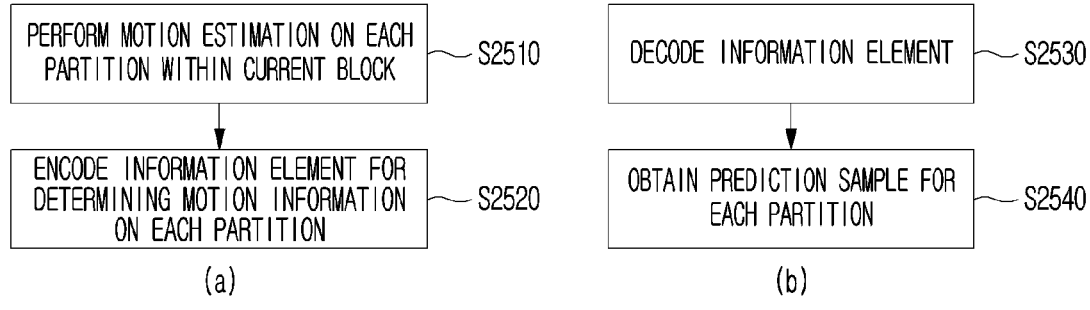
FIG. 25 is a flowchart of a process in which inter-prediction is performed in a case where the current block is partitioned into a plurality of partitions.

FIG. 25 is a flowchart of a process in which inter-prediction is performed when the current block is partitioned into a plurality of partitions.

FIG. 25(a) shows the operation of the encoder and FIG. 25(b) shows the operation of the decoder.

A partition may have a square, triangular or pentagonal shape. For convenience of description, it is assumed that the current block is partitioned into three partitions as in the example shown in FIG. 11 in the embodiment which will be described later. However, when the current block is partitioned into two partitions or four or more partitions, the operation according to the embodiment which will be described later can also be applied.

Through motion estimation, motion information on each partition can be determined (S2510).

At this time, the motion information on one of the partitions needs to be set such that it is not the same as the motion information on the neighboring partition. For example, in the example shown in FIG. 11, the motion information on the first partition cannot be set to be the same as the motion information on the second partition.

Upon determination of the motion information on each partition, an information element for determining the motion information on each partition can be encoded (S2520).

The decoder can decode the information element (S2530) and derive the motion information on each partition or perform motion estimation on each partition on the basis of the decoded information element.

Thereafter, prediction samples for each partition may be generated on the basis of the motion information on each partition, or prediction samples for each partition may be generated as a result of motion estimation for each partition (S2540).

When the motion information signaling mode is applied, the information element may include index information indicating a motion information candidate for each partition. For example, when the motion vector prediction mode is applied, index information indicating a motion vector prediction candidate and a motion vector difference value may be encoded for each partition. Alternatively, when the motion information merge mode is applied, index information indicating a motion information merge candidate may be encoded for each partition.

Figure 26:
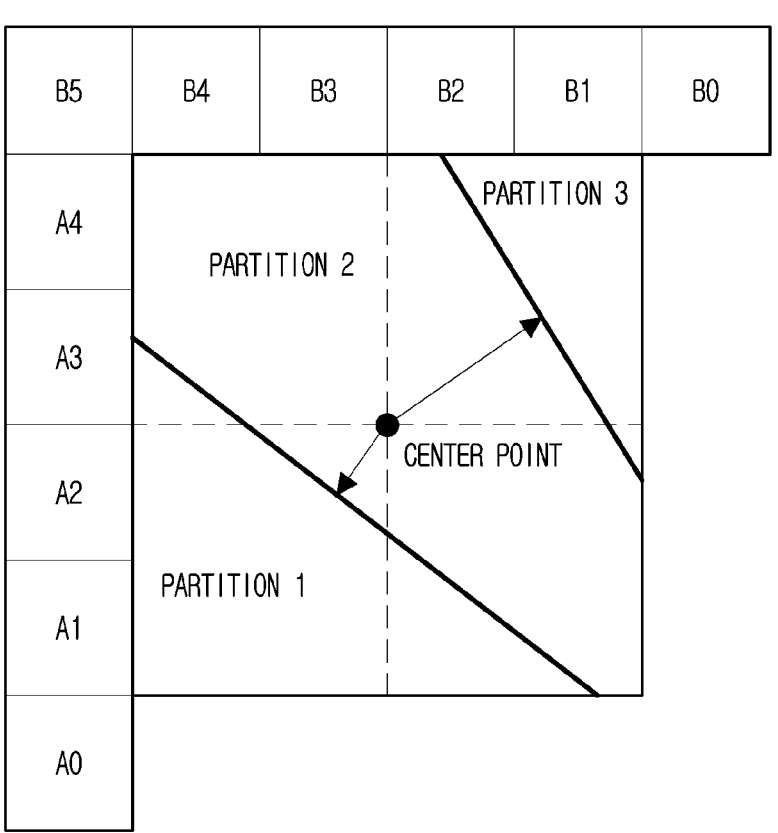
FIG. 26 is a diagram illustrating a process by which motion information candidates are derived.

FIG. 26 is a diagram illustrating a process by which motion information candidates are derived.

For convenience of description, it is assumed that the current block is 4×4 in size.

Motion information candidates can be derived on the basis of the position and size of the current block.

For example, in a case where a motion vector prediction list of size 2 is generated, a first motion vector prediction candidate may be derived from one of neighboring samples B0 to B5 adjacent to the top of the current block, and a second motion vector prediction candidate may be derived from one of neighboring samples A0 to A4 adjacent to the left side of the current block. Thereafter, a motion vector prediction list including the first motion vector prediction candidate and the second motion vector prediction candidate may be generated. If the number of motion vector prediction candidates that can be derived from spatial neighboring blocks is less than 2, a motion vector prediction candidate can be derived from a temporal neighboring block (Col in FIG. 15).

Alternatively, in a case where a motion information merge list is generated, motion information may be searched in the order of left neighbor sample A1, top neighbor sample B1, top right neighbor sample B0, bottom left neighbor sample A0, and top left neighbor sample B5. If available motion information is discovered a result of the search, this motion information can be set as a motion information merge candidate.

After searching for motion information on a temporal neighboring block of the current block, motion information merge candidates can be additionally derived on the basis of motion information on a spatial neighboring block (e.g., Col in FIG. 15).

When a motion information list is generated on the basis of the position and size of the current block, the motion information list can be commonly used for each partition. As an example, a motion vector or motion information of each of first, second, and third partitions using a single motion vector prediction list or a single motion information merge list.

At this time, the neighboring partitions may be set not to have the same motion vector or the same motion information. Accordingly, a motion information candidate selected for a neighboring partition may be set as an unavailable motion information candidate for the current partition.

For example, if a motion information merge candidate derived from A1 is selected for the first partition, a motion information merge candidate for the second partition may be selected from among the remaining motion information merge candidates excluding the motion information merge candidate derived from A1.

If the current block is partitioned into three or more partitions, neighboring partitions may be set not to have the same motion vector or the same motion information, whereas non-neighboring partitions may be set to have the same motion vector or the same motion information. Accordingly, encoding/decoding of motion information can be omitted for some partitions.

For example, index information indicating one of the motion information merge candidates may be encoded for each of the first partition and the second partition, whereas encoding of index information may be omitted for the third partition. In this case, the motion information on the third partition may be set to be the same as the motion information on the first partition that is not adjacent to the third partition.

A motion information list may be configured individually for each partition. At this time, the motion information list for each partition may include motion information candidates derived from positions adjacent to the corresponding partition. Alternatively, the motion information list for each partition may be composed only of motion information candidates derived from positions adjacent to the corresponding partition.

For example, in the example shown in FIG. 26, the motion vector prediction list or motion information merge list for the first partition may include a motion vector prediction candidate or a motion information merge candidate derived from at least one of positions A0 to A3 adjacent to the first partition.

The motion vector prediction list or motion information merge list for the second partition may include a motion vector prediction candidate or a motion information merge candidate derived from at least one of positions A3, A4, and B2 to B5 adjacent to the second partition.

The motion vector prediction list or the motion information merge list for the third partition may include a motion vector prediction candidate or a motion information merge candidate derived from at least one of positions B0 to B2 adjacent to the third partition.

If the number of motion information candidates included in the motion information list of each partition is less than a threshold value, additional motion information candidates may be derived from positions that are not adjacent to the partition, or two or more motion information candidates may be combined to generate a new motion information candidate.

In a case where a motion information list is generated for each partition, a motion information candidate that is the same as motion information on a neighboring partition may be set not to be included in the motion information list. For example, at the time of configuring the motion information merge list for the second partition, a motion information merge candidate that is the same as the motion information on the first partition may be set as unavailable. Likewise, at the time of configuring the motion information merge list for the third partition, a motion information merge candidate that is the same as motion information on the second partition may be set as unavailable.

Motion information lists for partitions may be generated in consideration of the coding order of the partitions. For example, a motion information candidate included in a motion information list of a partition encoded/decoded prior to the current partition may be inserted into the motion information list for the current partition. As an example, when encoding/decoding is performed in the order of the first partition, the second partition, and the third partition, a motion information candidate included in the motion information list of the first partition may be inserted into the motion information list of the second partition. Similarly, at the time of configuring the motion information list for the third partition, at least one of a motion information candidate included in the motion information list of the first partition or a motion information candidate included in the motion information list of the second partition may be used.

Since the same motion information is not set for neighboring partitions, a motion information candidate selected for a corresponding partition among motion information candidates of a previously encoded/decoded partition may not be inserted into the motion information list of the current partition. For example, at the time of configuring the motion information list for the second partition, among motion information candidates included in the motion information list for the first partition, a motion information candidate that is the same as the motion information on the first partition may be set to be unavailable for the second partition. Likewise, at the time of configuring the motion information list for the third partition, at least one of a motion information candidate that is the same as the motion information on the first partition among motion information candidates included in the motion information list for the first partition or a motion information candidate that is the same as the motion information on the second partition among motion information candidates included in the motion information list for the second partition may be set to be unavailable for the third partition.

As another example, for each partition, the encoder and the decoder may encode/decode motion information with reference to motion information at a predefined position. That is, it is possible to derive motion information on each partition by referring to only a defined position instead of generating a motion information list. As an example, information indicating whether motion information at a predefined position and motion information on a partition are the same may be encoded and signaled. If the motion information at the predefined position is different from the motion information on the partition, a motion vector difference value representing the difference between the motion vector of the predefined position and the motion vector of the partition may be additionally encoded and signaled.

Predefined positions for partitions may be different. Additionally, a plurality of positions may be predefined. In this case, motion information on a partition may be encoded/decoded using available motion information first discovered when the plurality of predefined positions is sequentially searched.

If motion information is not present at a predefined position, motion information on a partition may be encoded/decoded using motion information on a partition from a position that is different from the predefined position or using a zero vector. Here, the position that is different from the predefined position may be a position adjacent to the predefined position. For example, motion information on a partition can be encoded/decoded using motion information on a position adjacent to the left, right, top, or bottom of the predefined position.

A prediction sample for each partition can be obtained on the basis of the motion information on each partition.

As another example, a prediction sample for each partition may be obtained by generating a prediction block of the same size as the current block on the basis of the motion information on each partition, and then performing a weighted sum operation on a plurality of prediction blocks. At this time, a weight assigned to each prediction block may be adaptively set on the basis of at least one of the position of the prediction sample or the partition to which the prediction sample belongs.

Motion estimation for each partition may be performed using a template-based motion estimation method, a bidirectional estimation method, or a unidirectional estimation method.

In this case, an information element for determining motion information on each template may include at least one of information (e.g., a flag) indicating whether the decoder-side motion estimation method has been applied, information indicating one of a plurality of decoder-side motion estimation methods, or information for identifying a reference picture used in the decoder-side motion estimation method.

Figure 27:
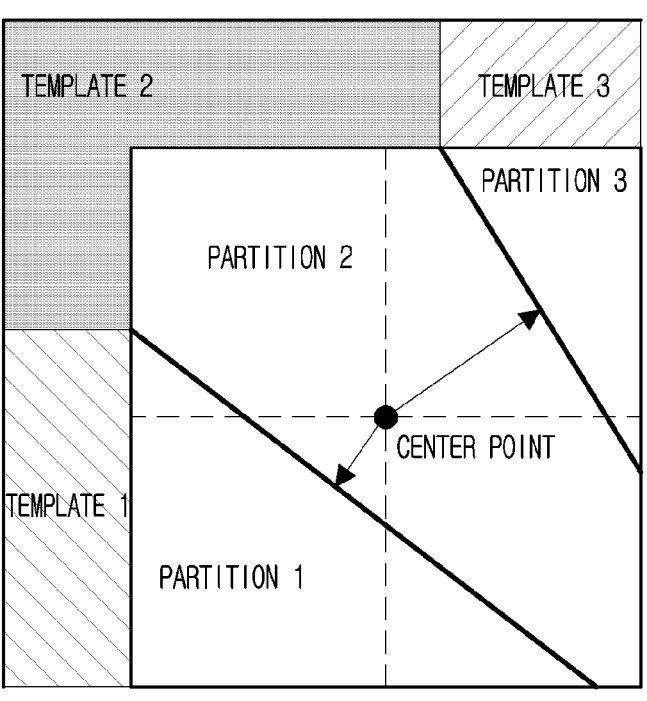
FIG. 27 shows an example in which motion estimation is performed on each partition using a template.

FIG. 27 shows an example in which motion estimation is performed on each partition using a template.

A template of each partition may be determined on the basis of at least one of the size, shape, or position of the partition. Accordingly, when the sizes, shapes, and/or positions of partitions are different, the sizes, shapes, and/or positions of templates for partitions may be different.

For example, only a region adjacent to a partition among previously reconstructed regions around the current block can be set as a template for the partition. For example, as in the example shown in FIG. 27, a template (first template) for the first partition may be composed of some of left reconstructed regions of the current block, and a template (second template) for the second partition may be configured to include some of upper reconstructed regions and some of left reconstructed regions of the current block. Likewise, a template (third template) for the third partition may be composed of some of the upper reconstructed regions of the current block.

Upon determination of the template (current template) of the current partition and a reference template with the lowest cost, the distance between the current template and the reference template can be set as a motion vector of the current partition. Alternatively, prediction samples for the current partition may be derived on the basis of a reference partition adjacent to the reference template and having the same shape as the current partition.

Next, a process in which intra-prediction is performed when the current block is partitioned into a plurality of partitions will be described in detail.

Figure 28:
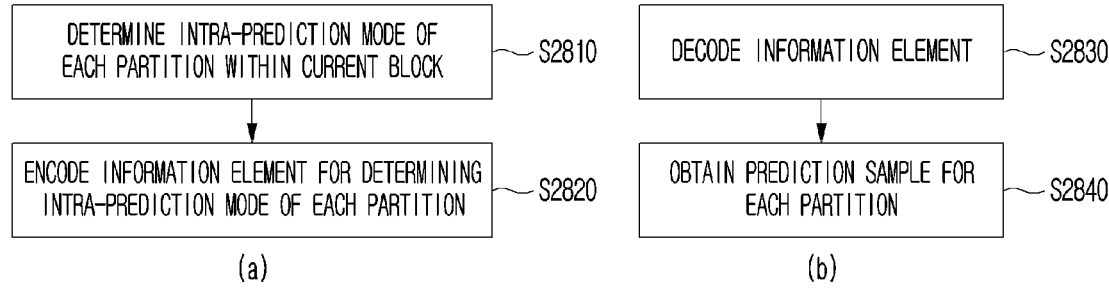
FIG. 28 is a flowchart of a process in which intra-prediction is performed when the current block is partitioned into a plurality of partitions.

FIG. 28 is a flowchart of the process in which intra-prediction is performed when the current block is partitioned into a plurality of partitions.

Figure 11:
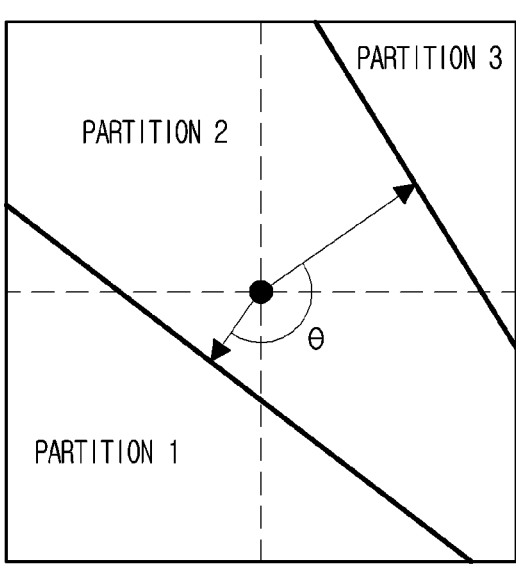

For convenience of description, in embodiments which will be described later, it is assumed that the current block is partitioned into three partitions, as in the example shown in FIG. 11. However, when the current block is partitioned into two partitions or four or more partitions, the operation according to the following embodiment can be applied.

FIG. 28(a) shows an operation of the encoder, and FIG. 28(b) shows an operation of the decoder.

An intra-prediction mode for each partition can be determined (S2810).

At this time, the intra-prediction mode of one of the partitions needs to be set such that it is not the same as the intra-prediction mode of a neighboring partition. For example, in the example shown in FIG. 11, the intra-prediction mode for the first partition cannot be set to be the same as the intra-prediction mode for the second partition.

Upon determination of the intra-prediction mode for each of the partitions, an information element for determining the intra-prediction mode for each partition can be encoded (S2820).

The decoder may decode the above information element (S2830) and derive the intra-prediction mode of each partition on the basis of the decoded information element.

Thereafter, prediction samples for each partition may be generated on the basis of the intra-prediction mode of each partition (S2840).

The intra-prediction mode of each partition may be derived on the basis of an intra-prediction mode list or a template.

As an example, in a case where the intra-prediction mode of each partition is encoded/decoded using the intra-prediction mode list, for each partition, at least one of a flag indicating whether there is an intra-prediction mode candidate that is the same as the intra-prediction mode of the partition or an index for identifying an intra-prediction mode candidate that is the same as the intra-prediction mode of the partition may be encoded/decoded. Alternatively, in a case where the current block is partitioned into a plurality of partitions, encoding/decoding of the flag may be omitted, and the intra-prediction mode of each partition may be derived on the basis of the intra-prediction mode list.

At this time, the intra-prediction mode of the current block may be set not to have the same value as the intra-prediction mode of a neighboring partition. For example, in the example shown in FIG. 11, the intra-prediction mode of the first partition may have a different value from the intra-prediction mode of the second partition. Accordingly, if the same intra-prediction mode candidate as the intra-prediction mode of the first partition is selected from the intra-prediction mode list, the intra-prediction mode candidate cannot be set as the intra-prediction mode of the second partition. As a result, the intra-prediction mode of the second partition may be selected from among the remaining intra-prediction mode candidates excluding the intra-prediction mode candidate that is the same as the intra-prediction mode of the first partition.

The intra-prediction modes of non-neighboring partitions may be set to the same value. For example, in the example shown in FIG. 11, the intra-prediction modes of the first partition and the third partition may be set to be the same. In this case, for the third partition, encoding/decoding of index information indicating one of intra-prediction mode candidates may be omitted.

The intra-prediction mode of each partition can also be derived on the basis of a template. For example, as described above with reference to FIG. 24, N intra-prediction modes from the intra-prediction mode with the lowest cost may be selected on the basis of the first template adjacent to the current block and the second template adjacent to the first template. Then, the intra-prediction mode for each partition can be selected from among the N intra prediction modes.

Here, N may be a natural number of 1 or more. N may have a fixed value in the encoder and the decoder. Alternatively, N may be determined on the basis of the number of partitions.

By performing intra-prediction on each partition, prediction samples for each partition can be obtained.

As another example, a prediction sample for each partition may be obtained by generating a prediction block of the same size as the current block through intra-prediction for each partition, and then performing a weighted sum operation on a plurality of prediction blocks. At this time, a weight assigned to each prediction block may be adaptively set on the basis of at least one of the position of the prediction sample or the intra-prediction mode of the partition to which the prediction sample belongs.

After partitioning the current block into a plurality of partitions, a coding mode may be determined for each partition. For example, when the current block is partitioned into three partitions as in the example shown in FIG. 11, it can be independently determined whether inter-prediction or intra-prediction is applied for each of the three partitions. Accordingly, information indicating the coding mode for each of the partitions may be encoded and signaled. For example, for each partition, a flag indicating one of inter-prediction and intra-prediction may be encoded and signaled.

At this time, the coding modes of non-neighboring partitions can be set to be the same. For example, in the example shown in FIG. 11, the first partition and the third partition may be set to have the same coding mode. In this case, encoding/decoding of the flag indicating the coding mode of the third partition may be omitted.

Alternatively, the coding mode of a partition may be determined in consideration of the position of the partition or the size of the partition.

For example, inter-prediction or intra-prediction can be fixedly applied to the largest partition among the partitions. A different coding mode from the coding mode of this partition may be applied to the remaining partition (s).

Alternatively, inter-prediction or intra-prediction may be fixedly applied to a partition at an intermediate position among the partitions. A different coding mode from the coding mode of this partition may be applied to the remaining partition (s).

Alternatively, inter-prediction or intra-prediction may be fixedly applied to partitions adjacent to the left boundary and/or top boundary of the current block among the partitions. A different coding mode from those of these partitions may be applied to the remaining partition (s).

In a case where the motion information merge mode is applied, the motion information on the current block can be set to be the same as motion information on a neighboring block. The current block may be encoded/decoded using the prediction information merge mode similar to the motion information merge mode. The prediction information merge mode refers to a prediction method of setting prediction information on the current block to be the same as prediction information on a neighboring block.

Here, the prediction information includes a coding mode (i.e., inter-prediction or intra-prediction), and the prediction information may further include an intra-prediction mode of the neighboring block when the coding mode indicates intra-prediction and further include motion information on the neighboring block when the coding mode indicates inter-prediction.

For example, if a neighboring block encoded with inter-prediction is selected in the prediction information merge mode, it is determined that inter-prediction is applied to the current block, and the motion information on the current block may be set to be the same as the motion information on the neighboring block. On the other hand, if a neighboring block encoded with intra-prediction is selected in the prediction information merge mode, it is determined that intra-prediction is applied to the current block, and the intra-prediction mode of the current block may be set to be the same as the intra-prediction mode of the neighboring block.

Information indicating whether the prediction information merge mode is applied may be signaled through a bitstream. As an example, the information may be a 1-bit flag.

Whether it is allowed to apply the prediction information merge mode to the current block may be determined on the basis of at least one of the size of the current block, the shape of the current block, the position of the current block (e.g., whether the current block comes into contact with the upper boundary of a CTU), the color component (e.g., whether it is a luma component or a chroma component), or a slice type.

Hereinafter, the prediction information merge mode will be described in detail with reference to the drawings.

Figure 29:
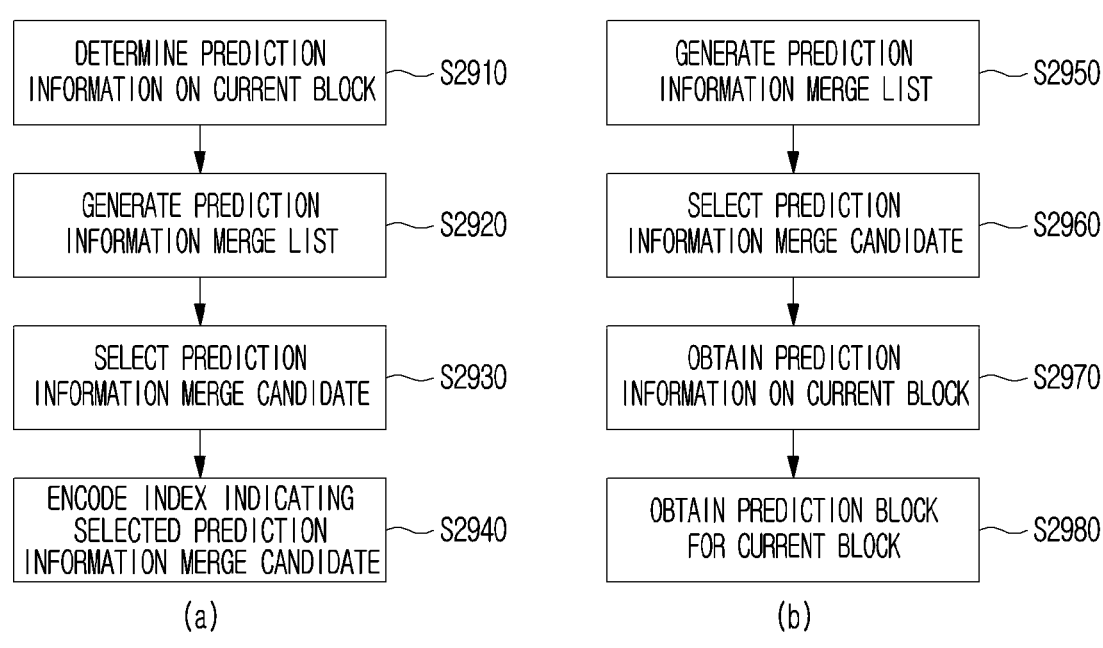
FIG. 29 is a flowchart of a process in which a prediction information merge mode is executed according to an embodiment of the present disclosure.

FIG. 29 is a flowchart of a process in which the prediction information merging mode is executed according to an embodiment of the present disclosure.

FIG. 29(*a*) shows an operation of the encoder, and FIG. 29(*b*) shows an operation of the decoder.

Prediction information on the current block can be determined (S2910). Specifically, an intra-prediction mode or motion information can be determined depending on the coding mode of the current block and whether the coding mode is intra-prediction or inter-prediction.

A prediction information merge list can be generated for the current block (S2920). The prediction information merge list may include a plurality of prediction information merge candidates.

Among the prediction information merge candidates, a prediction information merge candidate having the same prediction information as the prediction information on the current block can be selected (S2930), and an index indicating the selected prediction information merge candidate can be encoded and signaled (S2940).

The decoder can generate a prediction information merge list using the same method as the encoder (S2950).

Index information is decoded, and a prediction information merge candidate included in the prediction information merge list is selected on the basis of the decoded index information (S2960).

Prediction information on the selected prediction information merge candidate can be set as prediction information on the current block (S2970), and a prediction block can be generated on the basis of the prediction information on the current block (S2980).

The prediction information merge candidates may be derived from neighboring blocks adjacent to the current block.

Figure 30:
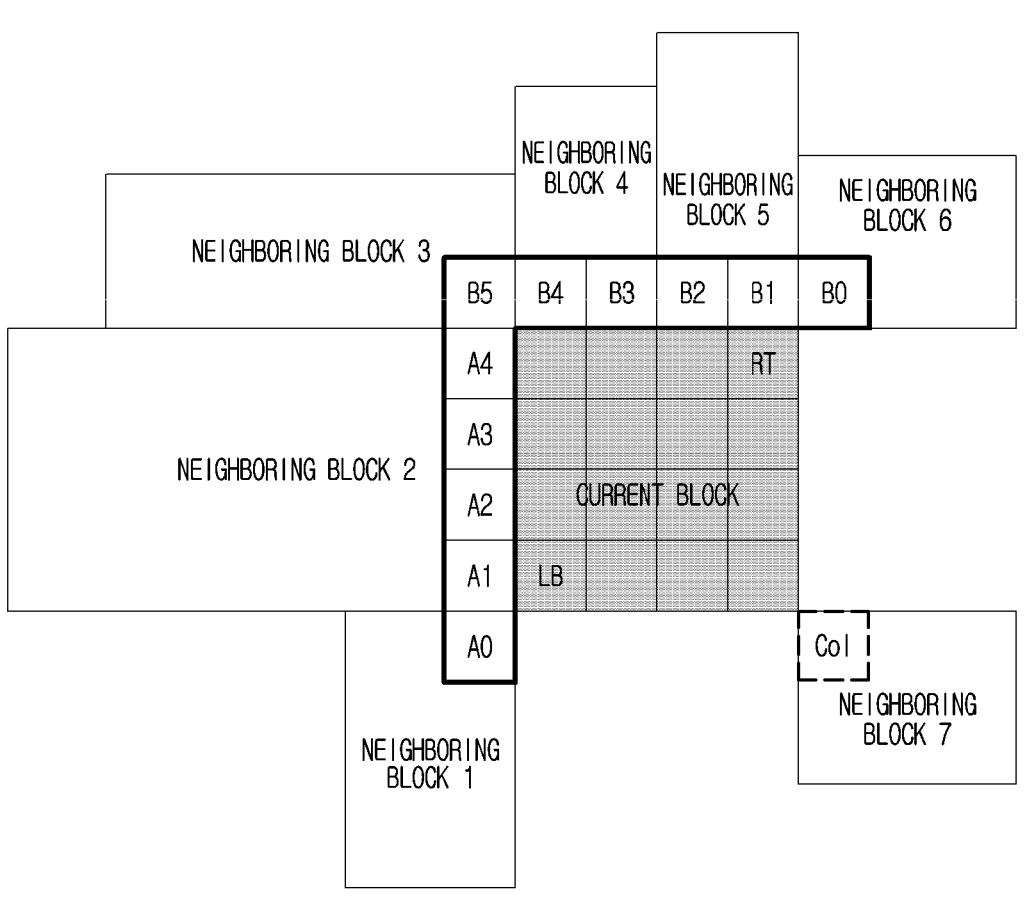
FIG. 30 is a diagram illustrating neighboring blocks used to derive prediction information merge candidates.

FIG. 30 is a diagram illustrating neighboring blocks used to derive prediction information merge candidates.

In the example shown in FIGS. 30, A0 to A4 represent neighboring samples adjacent to the left side of the current block, and B0 to B5 represent neighboring samples adjacent to the top of the current block. Col indicates the position of a sample located at the bottom right of the current block within a co-located picture.

Neighboring blocks including neighboring samples adjacent to the current block may be searched according to a predefined priority. As an example, the neighboring blocks can be searched in the order of A1, B1, B0, A0, B5, and Col. Thereafter, prediction information on available neighboring blocks may be inserted into the prediction information merge list as prediction information merge candidate.

Alternatively, priorities of prediction information merge candidates may be adaptively determined according to at least one of the size, shape, or partition type of the current block.

It is possible to prediction information on the current block on the basis of a cost of each neighboring block adjacent to the current block instead of encoding/decoding index information indicating one of the prediction information merge candidates included in the prediction information merge list.

For example, the cost of a neighboring block may be calculated on the basis of the sum of the absolute values of differences between a reconstructed sample within the neighboring block including a neighboring sample at a predefined position and a prediction sample. At this time, as in the example shown in FIG. 30, the sizes of neighboring blocks may not be uniform. In consideration of this, normalization can be performed by dividing the sum of the absolute values of differences between the reconstructed sample within the neighboring blocks and the prediction sample by the number of samples. The normalized sum of the absolute values can be calculated as the cost of the neighboring block.

Here, the neighboring sample of the predefined position may include at least one of A1, B1, B0, A0, B5, or Col.

Thereafter, prediction information on the neighboring block with the lowest cost among the plurality of neighboring blocks may be set as prediction information on the current block.

Alternatively, N neighboring blocks from the neighboring block with the lowest cost may be selected from among the plurality of neighboring blocks. Thereafter, the prediction information on the N neighboring blocks may be set as prediction information merge candidates, and then index information indicating one of the N prediction information merge candidates may be encoded and signaled. Here, N may be a natural number of 1 or more.

Alternatively, N neighboring blocks from the neighboring block with the lowest cost may be selected from among the plurality of neighboring blocks, and then N prediction blocks may be generated for the current block on the basis of prediction information on each of the N neighboring blocks. Thereafter, a final prediction block for the current block can be obtained through a weighted sum operation performed on the N prediction blocks. For example, when N is 2, two neighboring blocks with lower costs can be selected from among the neighboring blocks, and then two prediction blocks can be generated for the current block using prediction information on each of the two neighboring blocks. Thereafter, a final prediction block for the current block can be generated on the basis of a weighted sum operation performed on the two prediction blocks.

As another example, at least one neighboring block with a low cost may be selected from among neighboring blocks encoded with inter-prediction, and at least one neighboring block with a low cost may be selected from among neighboring blocks encoded with intra-prediction. That is, at least one neighboring block encoded with inter-prediction and at least one neighboring block encoded with intra-prediction can be selected.

Thereafter, a plurality of prediction blocks may be generated for the current block on the basis of the prediction information on each of the plurality of neighboring blocks, and then a final prediction block may be generated by performing a weighted sum operation on the plurality of prediction blocks.

When performing a weighted sum operation on N prediction blocks, the weight applied to each of the N prediction blocks may be derived on the basis of a weight list including a plurality of weight candidates. For example, when a weighted sum operation is performed on two prediction blocks, a weight indicated by a weight candidate selected from the weight list can be applied to the first prediction block. Additionally, a value derived by subtracting the weight applied to the first prediction block from a predetermined constant value may be set as a weight of the second prediction block.

When a weight is determined using the weight list, index information indicating one of a plurality of weight candidates may be encoded and signaled.

Alternatively, a weighted sum operation may be performed on N prediction blocks using weights predefined in the encoder and the decoder. As an example, an equal weight value may be applied to N prediction blocks.

Alternatively, a weight for each prediction block may be determined on the basis of a ratio of costs. As an example, if the cost for the first intra-prediction mode calculated based on a template is cost1 and the cost for the second intra-prediction mode calculated based on the template is cost2, a weight of cost1/(cost1+cost2) can be applied to the second prediction block generated through the second intra-prediction mode, and a weight of cost2/(cost1+cost2) can be applied to the first prediction block generated through the first-intra prediction mode.

The costs of neighboring blocks can be calculated at the time of encoding/decoding the current block.

Alternatively, the costs may be calculated and stored every time encoding/decoding of a block is completed.

In this case, the costs of neighboring blocks may be calculated in advance at the time of encoding/decoding the current block.

In calculating the cost of a neighboring block, it is possible to calculate the cost of the neighboring block on the basis of a partial area within the neighboring block instead of calculating the cost on the basis of the actual size of the neighboring block.

Figure 31:
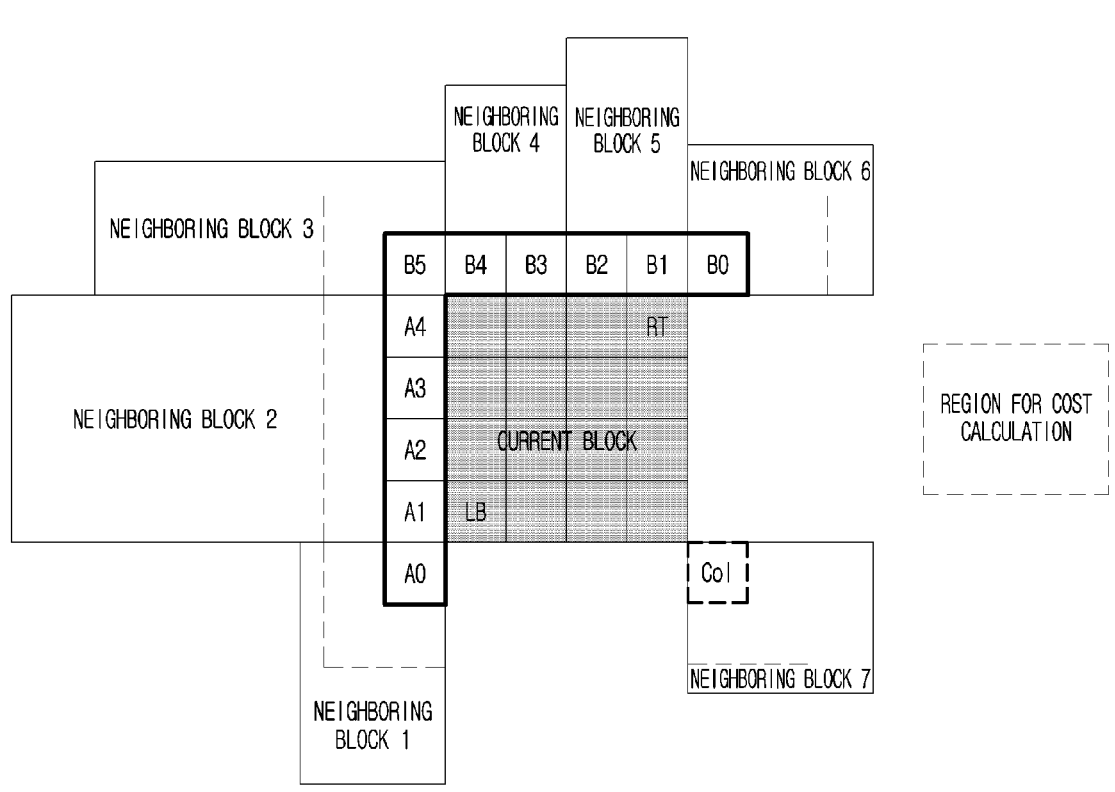
FIG. 31 shows an example in which a cost of a neighboring block is calculated on the basis of a reduced area.

FIG. 31 shows an example in which the cost of a neighboring block is calculated on the basis of a reduced area.

As in the example shown in FIG. 31, the cost of a neighboring block can be calculated on the basis of an area having a predetermined size adjacent to the current block in the neighboring block. For example, as in the example shown in FIG. 31, for a neighboring block adjacent to the top of the current block, the cost of the neighboring block may be calculated on the basis of an area composed of N rows at the bottom of the neighboring block. On the other hand, for a neighboring block on the left side of the current block, the cost of the neighboring block may be calculated on the basis of an area composed of M columns on the right side of the neighboring block. For a neighboring block adjacent to a corner of the current block, the cost of the neighboring block may be calculated on the basis of an area of an M×N size. Here, M and N may be the same value or different values. M and N are natural numbers of 1 or more and may be predefined values in the encoder and decoder. Alternatively, M or N may be adaptively determined on the basis of the size or shape of the current block.

As another example, the cost of a neighboring block can be calculated for a predefined area within the neighboring block. Here, the predefined area may be an area of a predefined size that borders the top border, bottom border, left border, or right border of the neighboring block, or is located in the center of the neighboring block. Here, the predefined size may be 4×4.

As another example, the insertion order of prediction information merge candidates may be determined on the basis of the costs of neighboring blocks using the prediction information merge list. For example, instead of inserting prediction information merge candidates in a predefined order, a prediction information merge candidate derived from a neighboring block with a low cost may be inserted into the prediction information merging list first. Accordingly, an index having a small value may be assigned to a prediction information merge candidate derived from a neighboring block with a low cost.

Alternatively, after inserting the prediction information merge candidates in a predefined order, the prediction information merge candidates may be rearranged on the basis of the costs of neighboring blocks. As an example, the prediction information merge candidates may be rearranged such that an index having a small value is assigned to a prediction information merge candidate derived from a neighboring block with a low cost.

When the current block is partitioned into a plurality of partitions, prediction information may be determined individually for each partition. As an example, prediction information for each partition can be determined using the prediction information merge list. In this case, for each of the partitions, index information indicating one of the prediction information merge candidates may be encoded and signaled.

Alternatively, prediction information on each partition may be determined on the basis of the costs of neighboring blocks.

Applying the embodiments described focusing on the decoding process or the encoding process to the encoding process or the decoding process is included in the scope of the present disclosure. Modification of the embodiments described in a predetermined order to embodiments in an order different from the predetermined order is also included in the scope of the present disclosure.

Although the above disclosure has been described based on a series of steps or a flowchart, this does not limit the chronological order of the disclosure and the series of steps may be performed simultaneously or in a different order as needed. In addition, each of components (e.g., units, modules, etc.) constituting a block diagram in the above-described disclosure may be implemented as a hardware device or software, and a plurality of components may be combined to form a single hardware device or software. The above-described disclosure may be implemented in the form of program instructions that can be executed through various computer components and recorded on a computer-readable recording medium. The computer-readable recording medium may include program instructions, data files, data structures, and the like alone or in combination. Examples of computer-readable recording media include magnetic media such as a hard disk, a floppy disk, and a magnetic tape, optical recording media such as a CD-ROM and a DVD, magneto-optical media such as a floptical disks, and hardware devices specifically configured to store and execute program instructions, such as a ROM, a RAM, and a flash memory. The hardware devices may be configured to operate as one or more software modules to perform processing according to the present disclosure, and vice versa.

Industrial Availability

The present disclosure may be applied to a computing or electronic device which may encode/decode a video signal.

What is claimed is:
1. A method of decoding a video, the method comprising:
    generating a prediction information merge list for a current block;

selecting one of prediction information merge candidates included in the prediction information merge list based on index information; and obtaining a prediction block for the current block based on prediction information on the selected prediction information merge candidate, wherein:

the prediction information includes intra-prediction mode information, an index assigned to each of the prediction information merge candidates in the prediction information merge list is determined based on a cost of each of the prediction information merge candidates, and wherein the cost is calculated based on differences between reconstructed samples within a current template and prediction samples obtained for the current template.

2. The video decoding method of claim 1, wherein prediction information merge candidates are derived based neighboring blocks adjacent to the current block.

3. The video decoding method of claim 1, wherein a flag indicating whether a prediction information merge mode is applied to the current block is explicitly signaled through a bitstream.

4. The video decoding method of claim 1, wherein, in a case where the current block is partitioned into a plurality of partitions, the index information is signaled for each of the partitions.

5. The video decoding method of claim 4, wherein the current block is partitioned by two partitioning lines, and information for identifying a direction and a position of each of the two partitioning lines is explicitly signaled.

6. The video decoding method of claim 4, wherein neighboring partitions among the plurality of partitions have different pieces of prediction information.

7. A video encoding method comprising:

generating a prediction information merge list for a current block;

selecting a prediction information merge candidate the same as prediction information on the current block among prediction information merge candidates included in the prediction information merge list; and encoding index information indicating the selected prediction information merge candidate, wherein:

the prediction information includes intra-prediction mode information, an index assigned to each of the prediction information merge candidates in the prediction information merge list is determined based on a cost of each of the prediction information merge candidates, and wherein the cost is calculated based on differences between reconstructed samples within a current template and prediction samples obtained for the current template.

8. The video encoding method of claim 7, wherein the prediction information merge candidates are derived based on neighboring blocks adjacent to the current block.

9. The video encoding method of claim 7, wherein, in a case where the current block is partitioned into a plurality of partitions, the index information is encoded for each of the partitions.

10. The video encoding method of claim 9, wherein neighboring partitions among the plurality of partitions have different pieces of prediction information.

11. A computer-readable recording medium storing executable instructions for encoding bitstreams generated by a video encoding method comprising:

generating a prediction information merge list for a current block;

selecting a prediction information merge candidate the same as prediction information on the current block among prediction information merge candidates included in the prediction information merge list; and encoding index information indicating the selected prediction information merge candidate, wherein the prediction information includes coding mode information, the prediction information includes intra-prediction mode information, an index assigned to each of the prediction information merge candidates in the prediction information merge list is determined based on a cost of each of the prediction information merge candidates, and wherein the cost is calculated based on differences between reconstructed samples within a current template and prediction samples obtained for the current template.

\* \* \* \* \*